(12) United States Patent
Shepherd et al.

(10) Patent No.: US 12,361,482 B2
(45) Date of Patent: Jul. 15, 2025

(54) TRACKING LINE OF CREDIT FUND TRANSFERS BETWEEN AN ELECTRONIC GAMING MACHINE AND A GAMING ESTABLISHMENT ACCOUNT

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 12 days.

(21) Appl. No.: 17/224,707

(22) Filed: Apr. 7, 2021

(65) Prior Publication Data

US 2022/0138845 A1 May 5, 2022

Related U.S. Application Data

(60) Provisional application No. 63/107,035, filed on Oct. 29, 2020.

(51) Int. Cl.
*G06Q 40/03* (2023.01)
*G06Q 20/10* (2012.01)
*G06Q 20/32* (2012.01)

(52) U.S. Cl.
CPC .......... *G06Q 40/03* (2023.01); *G06Q 20/102* (2013.01); *G06Q 20/3221* (2013.01); *G06Q 20/3223* (2013.01)

(58) Field of Classification Search
None
See application file for complete search history.

(56) References Cited

U.S. PATENT DOCUMENTS

| | | | |
|---|---|---|---|
| 8,272,959 B2* | 9/2012 | Yacenda | G07F 17/32 463/42 |
| 8,458,093 B1 | 6/2013 | Smith | |
| 9,293,002 B2 | 3/2016 | Richards et al. | |
| 9,711,004 B1 | 7/2017 | Ellis | |
| 10,235,837 B2* | 3/2019 | Ellis | G07F 17/3225 |
| 10,573,128 B2 | 2/2020 | Sanford et al. | |
| 10,580,255 B2* | 3/2020 | Ellis | G07F 17/3244 |
| 10,621,826 B2 | 4/2020 | Higgins et al. | |
| 10,643,426 B2 | 5/2020 | Higgins et al. | |
| 10,699,527 B2 | 6/2020 | Higgins et al. | |
| 10,706,667 B1 | 7/2020 | Shepherd et al. | |
| 10,916,090 B2 | 2/2021 | Miri et al. | |
| 10,916,093 B2 | 2/2021 | Richards et al. | |
| 10,930,115 B2 | 2/2021 | Sanford et al. | |
| 11,403,913 B2* | 8/2022 | Nelson | G06Q 20/0457 |
| 11,455,859 B2* | 9/2022 | Cleveland | G07F 17/3227 |
| 12,230,097 B2* | 2/2025 | Saffari | G06Q 20/36 |
| 2001/0003100 A1* | 6/2001 | Yacenda | G07F 17/3251 463/41 |

(Continued)

FOREIGN PATENT DOCUMENTS

| | | | | |
|---|---|---|---|---|
| WO | WO-2008039402 A2 * | 4/2008 | | G07F 17/32 |
| WO | WO-2015116728 A1 * | 8/2015 | | G06Q 20/045 |
| WO | WO-2021055511 A1 * | 3/2021 | | G06Q 20/06 |

*Primary Examiner* — Ayal I. Sharon
(74) *Attorney, Agent, or Firm* — Neal, Gerber & Eisenberg, LLP

(57) ABSTRACT

A system that facilitates a transfer of an amount of funds associated with a line of credit to a gaming establishment account and then to a gaming device, such as an EGM, wherein the amount of funds associated with the line of credit is separately tracked by the system.

15 Claims, 5 Drawing Sheets

(56) References Cited

U.S. PATENT DOCUMENTS

| | | | |
|---|---|---|---|
| 2002/0039921 A1 | 4/2002 | Rowe et al. | |
| 2002/0068624 A1 | 6/2002 | Ellis | |
| 2005/0288095 A1* | 12/2005 | Walker | G07F 17/3251 463/25 |
| 2008/0153583 A1* | 6/2008 | Huntley | G07F 17/3281 463/25 |
| 2008/0242403 A1* | 10/2008 | Weiss | G07F 17/3255 463/43 |
| 2009/0318220 A1* | 12/2009 | Arezina | G07F 17/3244 463/25 |
| 2010/0173702 A1* | 7/2010 | Van Luchene | G06Q 20/10 463/43 |
| 2010/0222132 A1 | 9/2010 | Sanford et al. | |
| 2011/0065497 A1 | 3/2011 | Patterson, Jr. | |
| 2011/0183745 A1* | 7/2011 | Gagner | G07F 17/3286 463/25 |
| 2012/0088570 A1 | 4/2012 | Schwartz | |
| 2012/0208618 A1* | 8/2012 | Frerking | G07F 17/3272 463/25 |
| 2013/0143644 A1* | 6/2013 | Van Luchene | A63F 13/65 463/25 |
| 2015/0011300 A1* | 1/2015 | Cardno | G07F 17/3218 463/25 |
| 2015/0011301 A1* | 1/2015 | Cardno | G07F 17/34 463/25 |
| 2015/0187177 A1* | 7/2015 | Warner | G07F 17/3244 463/25 |
| 2015/0243133 A1 | 8/2015 | Nicholas | |
| 2017/0316647 A1* | 11/2017 | Ellis | G07F 17/3244 |
| 2018/0040198 A1* | 2/2018 | Ellis | G07F 17/3244 |
| 2018/0040199 A1* | 2/2018 | Ellis | G07F 17/3244 |
| 2018/0040200 A1* | 2/2018 | Ellis | G07F 17/3244 |
| 2019/0043307 A1* | 2/2019 | Higgins | G06Q 20/28 |
| 2019/0188962 A1 | 6/2019 | Higgins et al. | |
| 2019/0340875 A1* | 11/2019 | Higgins | G07F 17/3223 |
| 2020/0410820 A1* | 12/2020 | Ellis | G06Q 20/405 |
| 2021/0264728 A1* | 8/2021 | Shigeta | G07F 17/3255 |
| 2022/0189247 A1* | 6/2022 | Shepherd | G07F 17/3244 |

* cited by examiner

TRACKING LINE OF CREDIT FUND TRANSFERS BETWEEN AN ELECTRONIC GAMING MACHINE AND A GAMING ESTABLISHMENT ACCOUNT

PRIORITY CLAIM

This application claims the benefit of and priority to U.S. Provisional Patent Application No. 63/107,035, filed on Oct. 29, 2020, the entire contents of which are each incorporated by reference herein.

BACKGROUND

In various embodiments, the systems and methods of the present disclosure track an amount of funds accessed from a gaming establishment credit system and transferred from a gaming establishment account to one or more gaming devices.

Electronic gaming machines and gaming tables may enable a player to play a game wherein the player may be required to place a wager.

BRIEF SUMMARY

In various embodiments, the system of the present disclosure tracks an amount of funds associated with a line of credit between a gaming establishment account and one or more gaming devices, such as one or more electronic gaming machines and/or one or more gaming table components associated with a gaming table.

In certain embodiments, the system utilizes one or more interfaces, such as a mobile device application being executed by a mobile device and/or a remote host controlled service window displayed by an electronic gaming machine ("EGM"), to coordinate the accessing of an amount of funds associated with an issued line of credit or marker and to facilitate the transfer of funds (activated from the issued line of credit) between one or more EGMs and a gaming establishment account, such as a cashless wagering account. In these embodiments, to account for the amount of funds in the gaming establishment account potentially being from different funding sources (e.g., a first amount of funds being drawn from the issued line of credit and a second amount of funds not being associated with any issued lines of credit) and additionally to minimize any friction created when an amount of funds drawn from an issued line of credit are paid back when cashing out from one EGM only to be reactivated at another EGM, the system separately tracks any amounts of funds drawn from any issued lines of credit without requiring the repeated activation of the same funds from the same issued line of credit.

More specifically, in various embodiments, the gaming establishment fund management system of the present disclosure operates with a gaming establishment credit system to enable a user to access an amount of funds activated by the gaming establishment credit system and further to track the accessed amount of funds as such funds are transferred between one or more gaming establishment accounts and one or more gaming devices, such as one or more EGMs. Such tracking, by the gaming establishment fund management system, of the amount of funds accessed from the gaming establishment credit system enables such funds to be transferred from a gaming device to a gaming establishment account without having to first be applied to satisfy any amounts owed to the gaming establishment credit system. That is, unlike certain other solutions which require that any amounts cashed out from an EGM to first be applied to satisfy an amounts owed on a line of credit (which creates user tension by having to continually draw funds from the same line of credit at each EGM played), the system of the present disclosure does not require any amount cashed out from an EGM to first be applied to satisfy an amount owed on a line of credit (and thus reduces user tension by not having to continually draw funds from the same line of credit at each EGM played). In other words, to facilitate ease of line of credit fund movement from one gaming device to another gaming device, the gaming establishment fund management system tracks such line of credit funds as a separate outstanding line of credit balance wherein an increase of an amount of funds (corresponding to an activation of a line of credit) in a gaming establishment account results in an increase of the balance of the gaming establishment account and an increase of the separate outstanding line of credit balance.

In addition to utilizing an outstanding line of credit balance to decrease friction associated with accessing funds from a line of credit at an EGM (via eliminating the requirement to repay the line of credit with each and every cash out from an EGM), the system monitors for an occurrence of a line of credit repayment event initiated by the gaming establishment fund management system and/or the gaming establishment credit system. In these embodiments, upon an occurrence of a line of credit repayment event associated with an activated line of credit (e.g., responsive to one or more player inputs or a gaming establishment reservation system determining that the player has checked out of their hotel room), the gaming establishment fund management system operates with the gaming establishment credit system to satisfy part or all of that outstanding line of credit. In such embodiments, since the system maintains a separate outstanding line of credit balance (which prevents burdening the gaming establishment credit system with a line of credit repayment event automatically occurring with each cash out from an EGM using funds associated with an activated line of credit), upon an occurrence of a line of credit repayment event and the subsequent transferring of an amount of funds representing part or all of the outstanding line of credit from a gaming establishment account to the gaming establishment credit system, the gaming establishment fund management decreases the balance of the gaming establishment account and also decreases the separate outstanding line of credit balance.

Accordingly, in certain embodiments, the system of the present disclosure includes a processor and a memory device that stores a plurality of instructions. When executed by the processor after an establishment of a line of credit and responsive to an occurrence of a line of credit activation event associated with a first amount of funds drawn from the line of credit, the instructions cause the processor to increase a gaming establishment account based on the first amount of funds, and increase an outstanding line of credit balance based on the first amount of funds, wherein the outstanding line of credit balance is maintained separate from the gaming establishment account. Moreover, when executed by the processor responsive to an occurrence of a line of credit repayment event associated with a second amount of funds, the instructions cause the processor to decrease the gaming establishment account based on the second amount of funds, and decrease the outstanding line of credit balance based on the second amount of funds.

It should be appreciated that such a configuration of not causing an automatic repaying of an amount of funds associated with an activated line of credit with each cash out from an EGM saves users time in accessing lines of credit (e.g., a player does not need to spend the time reactivating a line of credit each time the player visits another gaming device) and provides a relatively safer gaming establishment environment (e.g., minimizing players and/or gaming establishment personnel having to carry large sums of cash). Moreover, such a configuration of not causing an automatic repaying of an amount of funds associated with an activated line of credit with each cash out from each EGM prevents burdening the gaming establishment credit system and/or the gaming establishment fund management system with not repeatedly deactivating and reactivating the same line of credit (and the corresponding transfers of data associated with such funds between the gaming establishment credit system and the gaming establishment fund management system) as a player moves throughout a gaming establishment and uses the funds associated with the line of credit at different touchpoints, such as at different EGMs throughout the gaming establishment.

Additional features are described herein, and will be apparent from the following Detailed Description and the figures.

DETAILED DESCRIPTION

Figure 1:
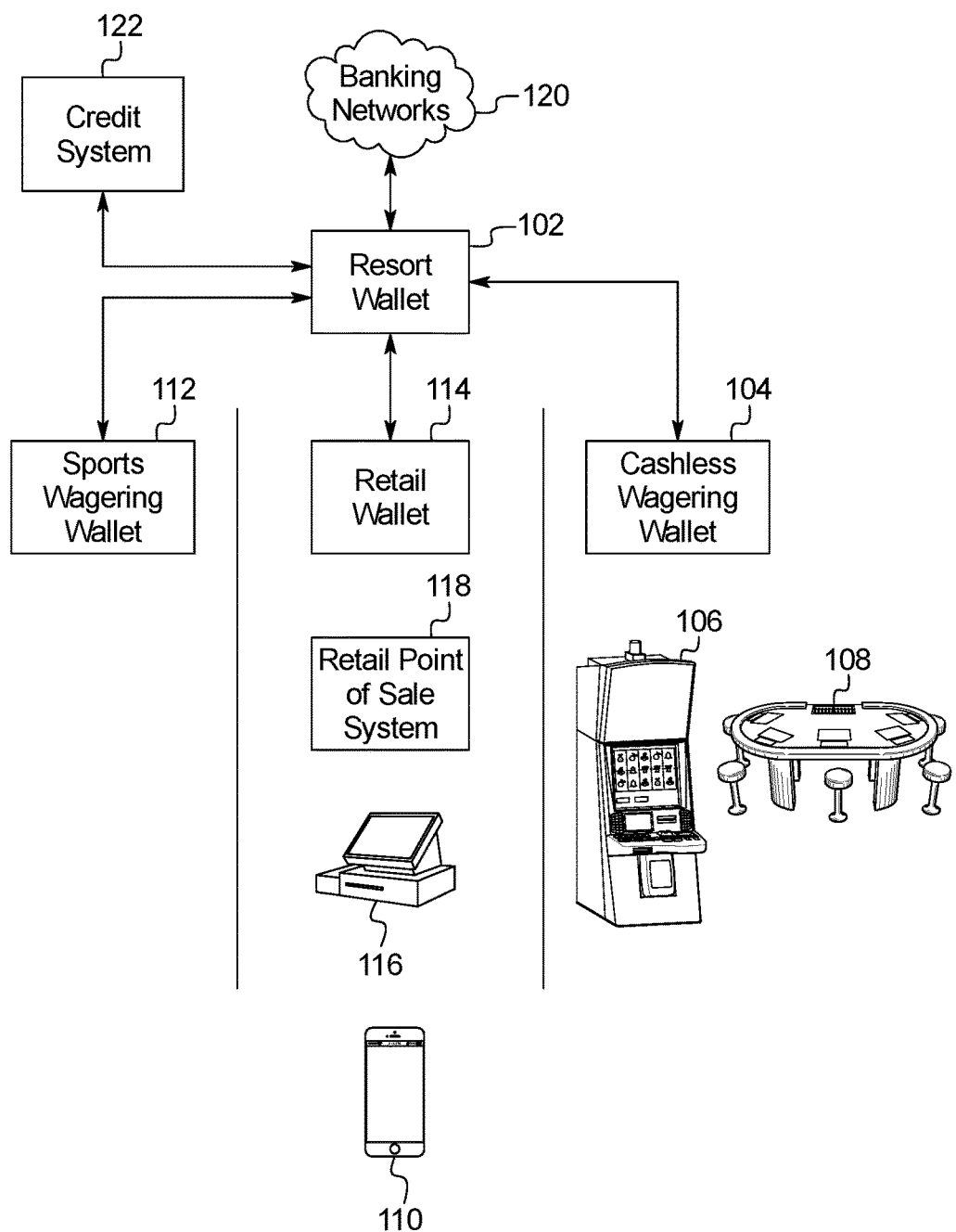
FIG. 1 is an example configuration of the architecture of a plurality of different components of the system of the present disclosure.

In various embodiments, the system of the present disclosure facilitates a transfer of an amount of funds associated with a line of credit to a gaming establishment account and then to a gaming device, such as an EGM, wherein the amount of funds associated with the line of credit is separately tracked by the system.

In certain embodiments, in view of the relatively limited avenues for a user, such as a player, to access funds from an issued line of credit at an EGM and the lack of user control in coordinating such transactions (i.e., certain prior systems require that each cash out at an EGM of funds associated with an activated line of credit results in automatically paying back the line of credit), the system enables the user to access an amount of funds associated with an activated line of credit without requiring that each cash out of such funds causes a paying back of the line of credit. That is, rather than a managed credit wagering system coordinating the transfer of funds associated with a line of credit to an EGM with minimal user interaction (e.g., without providing the user the ability to access less than the entire line of credit at the EGM and automatically using any cashed out funds from the EGM to satisfy the amount borrowed from the line of credit), in certain embodiments, the system separately accounts for the amount of funds activated from a line of credit thereby enabling a user to utilize such funds associated with a line of credit at an EGM without automatically using any cashed out funds from the EGM to satisfy the amount borrowed from the line of credit. Such a configuration provides the user greater control over their funds, such as providing the user with the ability to utilize funds associated with a line of credit across multiple EGMs without have to repeatedly reactivate a line of credit (thus saving the user time) and eliminating unnecessary transactions from the system (i.e., closing a line of credit at one EGM only to reopen the line of credit at another EGM).

It should be appreciated that these embodiments wherein the transfer of an amount of funds associated with an issued line of credit are separately maintained by the gaming establishment fund management system provide for a relatively more efficient gaming experience for users (e.g., a user does not need to repeatedly reactivate a line of credit at every EGM visited) and overcomes certain security concerns (e.g., users and/or gaming establishment personnel carrying large sums of cash) associated with both cash-based gaming and ticket voucher-based gaming. Such a configuration of enabling a user to transfer funds from a line of credit to a gaming establishment account wherein the funds in the gaming establishment account are accessible from an interface at or otherwise associated with the EGM further reduces the use of paper ticket vouchers (which a gaming establishment cage may issue against a line of credit for use at an EGM and/or a gaming table) and any ink associated with the production of such paper ticket vouchers to reduce the amount of waste produced by gaming establishments. Such a reduction in the amount of waste produced by gaming establishments provides an environmental benefit of implementing the system of the present disclosure.

System Accounts

In various embodiments, the present disclosure is directed to a gaming establishment fund management system including various components or sub-systems that are each associated with or otherwise maintain one or more electronic or virtual accounts. In these embodiments, the various accounts maintained for a user collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a player and/or retail patron, collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In certain embodiments, the gaming establishment fund management system includes a first cashless wagering system that maintains a first cashless wagering account. In these embodiments, a user, such as a player of an EGM, utilizes a mobile device application running on a mobile device and/or a physical instrument (e.g., a smart card or a user issued magnetic striped card which the user utilizes via inserting the card into a player tracking unit associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo machine located on a casino floor and/or a sports betting terminal (that offers wagering games and sports betting opportunities)). For example, as seen in FIG. 1, the gaming establishment fund management system includes a first cashless wagering system (not shown) that maintains a Cashless Wagering Wallet 104 (e.g., a first cashless wagering account) which is in communication with the resort wallet 102. In this example, to facilitate the transfer of funds from this cashless wagering account to a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the resort wallet 102. In this example, to facilitate the transfer of funds from this cashless wagering account to a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. Such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the resort wallet 102. In this example, to facilitate the transfer of funds from this gaming establishment retail account to an account associated with a retailer to purchase goods and/or services from the retailer, the system utilizes a retail wallet identity, such as a mobile device 110 running a mobile device application that interfaces with a point-of-sale terminal 116 of a retail point-of-sale system 118 of the retailer, and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a retailer.

It should be appreciated that in various embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system is in communication with one or more external funding sources which maintain one or more external accounts for the user. For example, as seen in FIG. 1, the gaming establishment fund management system that maintains the resort wallet 102 is in communication with a network of one or more banks or other financial institutions (i.e., the banking networks 120) which operate to electronically transfer funds from the user's accounts maintained at such banks or financial institutions to one or more of the accounts maintained by the gaming establishment fund management system. In certain embodiments, such external accounts include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any component or sub-system of the present disclosure can be in communication with one or more external funding sources. In different embodiments, the system utilizes a mobile device running a mobile device application, a kiosk, an EGM, a remote host controlled service window displayed by an EGM, a component of a gaming establishment patron management system, such as a player tracking unit, and/or a gaming establishment interface to facilitate the transfer of funds from a third-party account.

In certain embodiments, the gaming establishment fund management system is in communication with one or more credit systems which each issue the user one or more lines of credit or markers. For example, as seen in FIG. 1, the gaming establishment fund management system that maintains the resort wallet 102 is in communication with a gaming establishment credit system (i.e., the credit system 122) to facilitate the establishment of an amount of funds in the gaming establishment fund management account via one or more lines of credits. In this example and as described below, to facilitate a transfer of funds from the line of credit issued by the credit system to a cashless wagering account (and then to a credit balance of an EGM 106 and/or a credit balance of a gaming table component (not shown) associated with a gaming table 108), the system utilizes a mobile device 110 running a mobile device application that interfaces with one or more components of the credit system to enable a user, such as a player of the EGM or a player at the gaming table, access to the issued line of credit. It should be appreciated that while illustrated as the gaming establishment fund management system being in communication with one or more credit systems, in different embodiments, any component or sub-system of the present disclosure can be in communication with one or more credit systems.

In certain embodiments wherein the gaming establishment fund management system is in communication with one or more credit systems which each issue the user one or more lines of credit or markers, the gaming establishment fund management system (and/or the gaming establishment credit system) maintains an outstanding line of credit balance or account which tracks the amount of funds owed to the gaming establishment credit system. In these embodiments, the gaming establishment fund management system maintains this outstanding line of credit balance or account to enable greater user flexibility in how they use the activated funds from a line of credit (when compared to a system that automatically pays back part or all of the funds from an activated line of credit with each cash out from each EGM). In such embodiments, since the activated line of credit need not be repaid with each cash out from each EGM (and thus remains outstanding until paid back upon an occurrence of a line of credit repayment event), the user can transition from one EGM to another EGM (or other gaming device) with complete access to the available amount of funds of the activated line of credit. That is, since the funds from a credit balance of an EGM are transferred to a gaming establishment account, such as a cashless wagering account, upon a cash out event at the EGM, such funds remain available for immediate use at another EGM (or another gaming device) without requiring the user to reactivate any lines of credit with any gaming establishment credit systems. Such a configuration provides a user greater control over the funds owed to the gaming establishment credit system under the activated line of credit.

In certain embodiments (not shown), the gaming establishment fund management system is also in communication with one or more credit reporting/credit risk systems which monitor and report on various accounts associated with the user. For example, the gaming establishment fund management system that maintains the resort wallet is in communication with one or more credit reporting and risk systems. These credit reporting and risk systems monitor and report on a credit rating and status of one or more accounts maintained for the user at various funding sources, such as various financial institutions. It should be appreciated that while illustrated as the gaming establishment fund management system being in communication with one or more credit reporting networks and one or more credit reporting/credit risk systems, in different embodiments, any component or sub-system of the present disclosure can be in communication with one or more credit reporting/credit risk systems.

In certain embodiments, the system utilizes one mobile device application to interact with the different components of the gaming establishment fund management system to access funds maintained in the different gaming establishment accounts associated with the user and/or to access funds associated with one or more lines of credit or markers issued to the user. For example, utilizing the same mobile application, a mobile device interacts with both the first cashless wagering system of the gaming establishment fund management system and the credit system in communication with the gaming establishment fund management system. In certain embodiments, the system utilizes multiple mobile device applications to interact with the different components of the gaming establishment fund management system to access funds maintained in the different gaming establishment accounts associated with the user and/or to access funds associated with one or more lines of credit or markers issued to the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to access funds associated with different gaming establishment accounts and/or to access funds associated with one or more lines of credit issued to the user, the system utilizes a kiosk, an EGM, a remote host controlled service window displayed by an EGM, a display device/input device associated with a seat-level gaming table component, a display device/input device associated with a table-level gaming table component, a display device/input device associated with a mobile gaming table component, a component of a gaming establishment patron management system, such as a player tracking unit, and/or a gaming establishment interface, such as a casino desk, to access the funds associated with such gaming establishment accounts and/or to access funds associated with one or more lines of credit issued to the user. It should be further appreciated that while illustrated in FIG. 1 as using a mobile device running a mobile device application to access funds associated with different gaming establishment accounts (e.g., a cashless wagering account and a gaming establishment retail account) and/or to access funds associated with one or more lines of credit issued to the user, a physical instrument, such as a smart card or a user issued magnetic striped card may additionally or alternatively be utilized to enable a user access to such gaming establishment accounts and/or to access funds associated with one or more lines of credit issued to the user.

Accessing Funds from an Issued Line of Credit and Transferring Accessed Funds to/from an EGM In various embodiments, the system of the present disclosure enables a user, such as an identified player at an EGM, to make one or more inputs to cause a deposit an amount of funds associated with an issued line of credit into a gaming establishment account, wherein such an amount of funds are individually tracked by the system as an amount owed to a gaming establishment credit system. The system further enables the user to make one or more inputs to initiate a transfer of funds from the gaming establishment account to a credit balance of an EGM, wherein upon being cashed out, such funds return to the gaming establishment account (and are not automatically used to settle part or all of the amount owed on the line of credit).

In certain embodiments, if a user wants to access the funds associated with a line of credit or marker at an EGM, then following the user establishing the line of credit or marker with a gaming establishment credit system (e.g., following a user applying for a line of credit (with or without presenting a check or other bank account information in the event the line of credit is not paid back by the user) and the credit system approving the line of credit for up to a set amount of funds), the user pairs or links their mobile device with the EGM, wherein, as described below, this pairing or linkage between the mobile device and the EGM occurs via one or more applications being run or executed on the mobile device.

Figure 2:
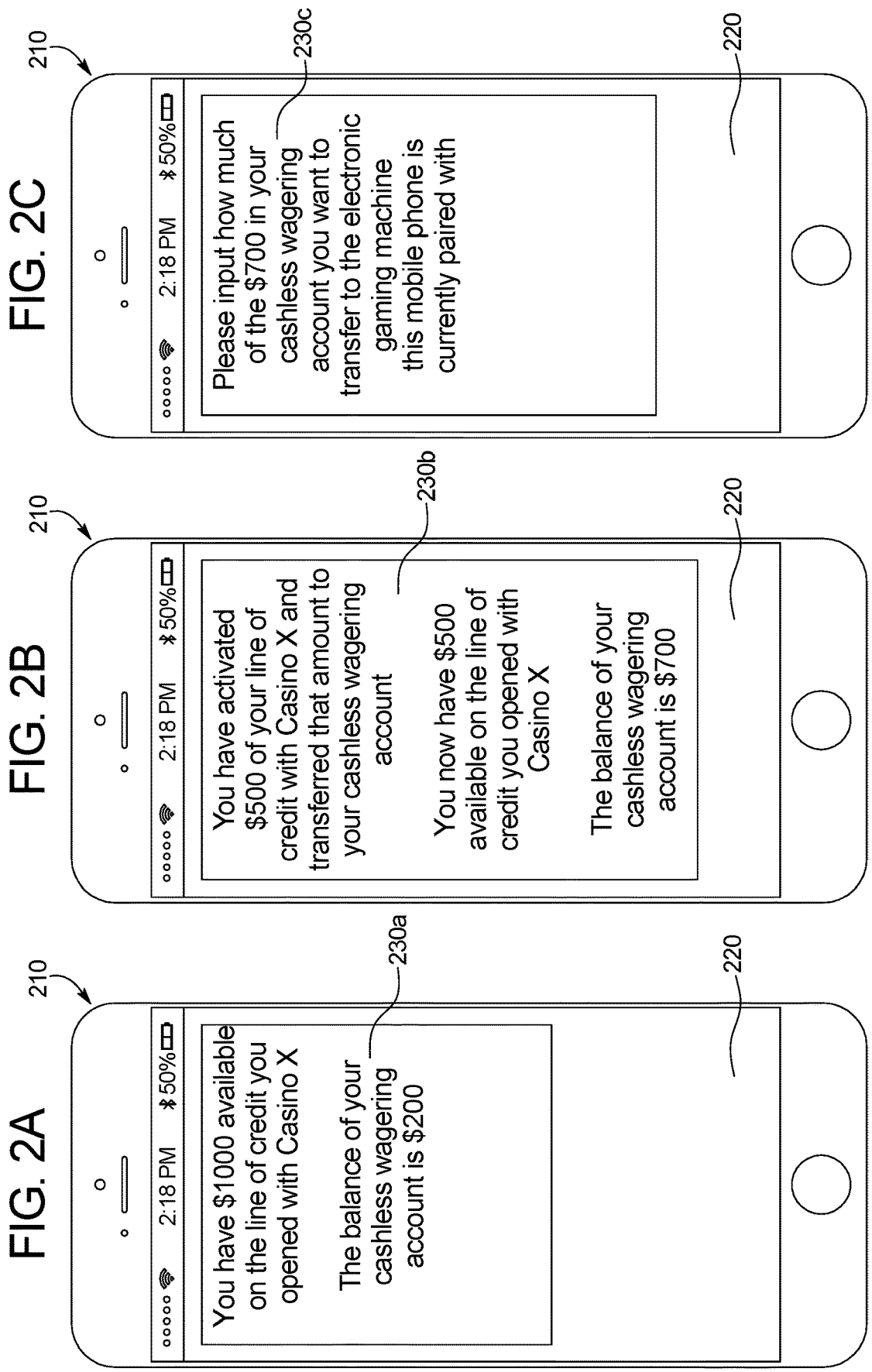
FIGS. 2A, 2B, and 2C are example graphical user interfaces displayed in connection with activating a line of credit via a mobile device application and transferring funds accessed from the line of credit between a gaming establishment account and an electronic gaming machine.

Following the pairing between the mobile device and the EGM (or a component of the EGM, such as a slot machine interface board ("SMIB") or other component of a gaming establishment management system supported by the EGM), the system enables the user to utilize a mobile device to view information about one or more issued lines of credit (e.g., an available amount of funds associated with the issued line of credit and/or an amount of funds associated with the issued line of credit previously accessed) as well as the balance of zero, one or more gaming establishment accounts. For example, as seen in FIG. 2A, a mobile device application 220 of a mobile device 210 displays a message 230a to a player that they have an untapped line of credit of $1000 available to be accessed. As further seen in this example, the mobile device application 220 of the mobile device 210 additionally displays a message 230a to the player that they have an account balance of $200 in their cashless wagering account. Although not shown in this example, since the line of credit of $1000 remains fully available, the outstanding line of credit balance maintained by the system for this player would be $0.

In addition to enabling the user to view, via the mobile device application of the paired mobile device, information about one or more issued lines of credit, the system enables the user to activate all or part of the available amount of funds associated with the issued line of credit. That is, the system enables the user to access the issued line of credit from the mobile device application wherein the accessed amount of funds are transferred to a gaming establishment account associated with the user, such as the user's cashless wagering account and then transferred to a credit balance of the EGM. In these embodiments, interfacing with the mobile device application (or alternatively the EGM or a component of the EGM), the system enables the player to make one or more inputs regarding the requested access to the line of credit, such as, but not limited to, one or more inputs to indicate an amount of funds to be accessed from the line of credit, one or more inputs to approve the indicated amount of funds to be accessed from the line of credit, and/or one or more inputs to confirm the accessing of the line of credit.

It should be appreciated that certain jurisdictional regulations and/or gaming establishment policies require the user to approve their transaction to access the funds on their issued line of credit. In one such embodiment, the user acknowledges the approval of accessing the issued line of credit by entering a personal identification number ("PIN") via the mobile device application, providing a signature and/or presenting a biometric identifier to the mobile device. In another embodiment, the user acknowledges the approval of accessing the issued line of credit by entering a PIN, providing a signature and/or presenting a biometric identifier to the EGM or a peripheral device associated with the EGM, such as a display device or input device associated with a SMIB in communication with the EGM.

In these embodiments, following receipt of the user inputted data associated with the determined amount of funds to be accessed from the issued line of credit and a confirmation from the user that they approve of the transaction and agree to any terms associated with the transaction, the mobile device application (and/or the EGM or a component of the EGM, such as the SMIB) communicates one or more messages to the gaming establishment credit system to log the user into the gaming establishment credit system (if necessary) and request an activation of the amount of funds to be accessed from the issued line of credit of the user. Upon receiving the messages from the mobile device application (and/or the EGM or the component of the EGM, such as the SMIB) and verifying the request, the gaming establishment credit system proceeds with operating with the gaming establishment fund management system or a component of the gaming establishment fund management system, such as a gaming establishment cashless wagering system, to log the user into a gaming establishment account associated with the user (if necessary) and potentially transfer the amount of funds to be accessed from the issued line of credit of the user to the gaming establishment account associated with the user, such as to a gaming establishment cashless wagering account associated with the user.

In certain embodiments, to complete a transfer of an amount of funds associated with a line of credit to a gaming establishment account, the gaming establishment credit system determines whether to authorize the activation of the determined amount of funds from the issued line of credit. In these embodiments, if the gaming establishment credit system determines not to authorize the activation of the determined amount of funds from the issued line of credit (e.g., the gaming establishment credit system determines that the requested amount exceeds the maximum amount available under the issued line of credit), the gaming establishment credit system communicates a denial to the mobile device application (and/or the EGM or a component of the EGM). In certain embodiments, following the denial, one or more display devices associated with the mobile device (and/or the EGM or a component of the EGM) display a denial of line of credit activation to the user.

On the other hand, if the gaming establishment credit system determines to authorize the activation of the determined amount of funds from the issued line of credit, the gaming establishment credit system updates the amount available of the issued line of credit and communicates an authorization of the requested amount of funds to the gaming establishment fund management system. Upon receiving the authorization, the gaming establishment fund management system updates a balance of a gaming establishment account by the requested amount of funds activated from the line of credit. Additionally, upon receiving the authorization, the gaming establishment fund management system updates an outstanding line of credit balance to reflect the amount of funds activated from the line of credit. As such, upon an amount of funds activated from a line of credit being accessed by a user (and the gaming establishment credit system exposing the gaming establishment fund management system to information about the amount owed by the user to repay the outstanding amount of the line of credit), the amount of funds from the line of credit is not only added to any funds residing in the destination gaming establishment account, such as a cashless wagering account, but the amount of funds from the line of credit is separately added to an outstanding line of credit balance.

In certain embodiments, the outstanding line of credit balance is maintained by the gaming establishment fund management system and updated responsive to transfers between the gaming establishment fund management system and the gaming establishment credit system. In certain embodiments, the outstanding line of credit balance is maintained by the gaming establishment credit system and determined by the gaming establishment fund management system by a request to the gaming establishment credit system. In these embodiments, while the gaming establishment credit system may appear as another component of the gaming establishment fund management system, transactions between the gaming establishment fund management system (or a component of the gaming establishment fund management system, such as the cashless wagering system) and the gaming establishment credit system are decorated in such a fashion to enable them to be identified as interactions with the gaming establishment credit system. Such a configuration enables the gaming establishment fund management system (or a component of the gaming establishment fund management system, such as the cashless wagering system) to implement various rules, such as when funds from the gaming establishment credit system are deposited into a gaming establishment account of the gaming establishment fund management system, the gaming establishment fund management system increases both the balance of the gaming establishment account and the outstanding line of credit balance. Conversely, when funds are withdrawn from a gaming establishment account of the gaming establishment fund management system and transferred to the gaming establishment credit system, the gaming establishment fund management system decrease both the balance of the gaming establishment account and the outstanding line of credit balance.

In certain embodiments, in association with the transfer of an amount of funds associated with activated line of credit and the corresponding increase of the outstanding line of credit balance, the system communicates a transfer of funds confirmation, wherein one or more display devices associated with the mobile device (and/or the EGM or a component of the EGM) display a confirmation of the transfer of the amount of funds from the line of credit to the gaming establishment account. For example, following the player utilizing a mobile device application to make one or more inputs to activate $500 of a $1000 line of credit (not shown), as seen in FIG. 2B, the mobile device application 220 of a mobile device 210 displays a message 230*b* to a player that they have activated $500 of their line of credit and $500 has been transferred to their cashless wagering account resulting in an account balance of $700 in their cashless wagering account and $500 of their line of credit remaining available to be accessed. In this example, the increase of the cashless wagering account of $500 in association with the activation of the line of credit results in a corresponding increase of $500 of the outstanding line of credit balance (not shown) maintained by the gaming establishment fund management system. Although not shown in this example, since $500 of the line of credit of $1000 has been utilized, the outstanding line of credit balance maintained by the system for this player would be $500.

In certain embodiments, the gaming establishment credit system enables a user to activate funds from a single line of credit or marker. In another embodiment, the gaming establishment credit system enables a user to activate funds from a plurality of lines of credit or markers. In one such embodiment wherein a user has activated funds from two or more lines of credit, the gaming establishment fund management system maintains a single outstanding line of credit balance to account for the amounts of funds currently owed across the two or more lines of credit. In this embodiment, such an aggregate outstanding line of credit balance is increased as amounts of funds associated with any of the lines of credits are activated and decreased as amounts of funds associated with any of the lines of credits are paid back. In another such embodiment wherein a user has activated funds from two or more lines of credit, the gaming establishment fund management system maintains a plurality of outstanding line of credit balances to account for the amounts of funds currently owed for each respective line of credit. In this embodiment, each individual outstanding line of credit balance is increased as amounts of funds associated with that individual line of credit are activated and decreased as amounts of funds associated with that individual line of credit are paid back.

In certain embodiments, to account for the activation of an amount of funds from one or more lines of credit, the gaming establishment credit system (and/or the gaming establishment fund management system) tracks the activities associated with each line of credit to ensure proper auditing and reporting of activities associated with such lines of credit (and to aid in providing evidence of any future disputes regarding such lines of credit). In these embodiments, in association with each line of credit, the system tracks one or more of a unique identifier, an issuer, a withdraw unique identifier, a withdraw date, an amount withdrawn, a repayment history (including amounts and dates), and/or a fee history (including amounts and dates).

It should be appreciated that following the completion of the transfer of an amount of funds associated with the line of credit to the gaming establishment account and to mitigate the risk a user with an outstanding line of credit balance from potentially attempting to leave a gaming establishment without first repaying part or all of their borrowed amount, in certain embodiments, if the outstanding line of credit balance is greater than zero, then the gaming establishment fund management system (or a component of the gaming establishment fund management system, such as the cashless wagering system) enables the withdrawing of funds from the gaming establishment account to certain devices (e.g., EGMs, gaming table components, a device associated with the gaming establishment credit system and lottery kiosks), but prohibits (or otherwise imposes one or more limitations on) the withdrawing of funds from the gaming establishment account to certain other devices (e.g., a point-of-sale terminal of a retailer). That is, in certain embodiments, if a user currently owes an amount of money on one or more lines of credits, the system restricts the use of funds from one or more gaming establishment accounts (or imposes limits to the amount of funds that may be withdrawn from such accounts) at least partially funded with an amount of money from such lines of credit. For example, if an outstanding line of credit balance is greater than zero, the cashless wagering system will not permit withdrawals from the user's cashless wagering account (or imposes limits to the amount of funds that may be withdrawn from the cashless wagering account) for an amount of cash withdrawn from a kiosk or from a gaming establishment cashier/cage. In another example, if an outstanding line of credit balance is greater than zero, the cashless wagering system will not allow transfers from the user's cashless wagering account (or imposes limits to the amount of funds that may be transferred from the cashless wagering account) to an external system, such as an external account or a retail account associated with a retailer. It should be appreciated that since the gaming establishment account which the funds from the line of credit are transferred to may include funds from other sources, to prevent imposing any unnecessary restrictions on such funds from other sources, in certain embodiments, if the outstanding line of credit balance is not greater than zero, the system imposes no additional restrictions on how such funds may be utilized.

In certain embodiments, following the completion of the transfer of an amount of funds associated with the line of credit to the gaming establishment account, such as a cashless wagering account associated with a user, the system enables the user to utilize a mobile device application to facilitate a transfer of an amount of funds from the gaming establishment account to a gaming device, such as an EGM. In certain embodiments, the mobile device application enables the user to input an amount of funds to be transferred to the EGM, wherein the amount of funds may be part of or all of the amount accessed from the line of credit. For example, as seen in FIG. 2C, the mobile device application 220 of a mobile device 210 displays a message 230c to a player prompting them to indicate an amount of the $700 in their cashless wagering account that they want to transfer to the EGM. Although not shown in this example, since the transfer of funds from the cashless wagering account to the EGM does not alter that $500 of the line of credit of $1000 has been utilized, the outstanding line of credit balance maintained by the system for this player would remain $500.

In certain embodiments, the mobile device application enables the user to select an amount of funds to be transferred from a listing of available amounts of funds to be transferred to the EGM. In different embodiments, the listing of available amounts to be transferred is previously selected by the user, selected by a gaming establishment or selected by a third-party. In certain embodiments, the mobile device application enables the user, a gaming establishment and/or a third-party to modify the listing of available amount of funds. In another embodiment, the mobile device application determines the listing of available amount of funds based on one or more characteristics associated with the user, such as the user's prior amounts transferred, the user's wagering history, and/or the user's status. In another embodiment, the mobile device application determines the listing of available amount of funds based on one or more characteristics associated with the EGM, such as based on the denomination, game type, minimum bet and/or maximum available wager amount of the EGM.

In certain embodiments, following the determination of an amount of funds to be transferred from the gaming establishment account, such as the cashless wagering account, to the EGM, the mobile device application prompts the user to cause the mobile device to engage the EGM or a component of the EGM, such as prompting the user to tap the mobile device to a player tracking card reader or other designated location(s) of the EGM. After such engagement (or after the determination of an amount of funds to be transferred if no mobile device to EGM engagement is required), the mobile device application communicates, via a wireless communication protocol (including, but not limited to: Bluetooth™, Bluetooth™ Low Energy ("BLE"), one or more cellular communication standards (e.g., 3G, 4G, 5G, LTE), one or more Wi-Fi compatible standards, and one or more short range communication protocols (e.g., a near field communication ("NFC") protocol), data associated with the determined amount of funds to be transferred from the gaming establishment account to the EGM. For example, wherein the transfer of funds is from a cashless wagering account, the EGM (or a component of the EGM, such as a SMIB and/or the mobile device application) proceeds with operating with a cashless wagering system to log the player into a cashless wagering account associated with the player (if necessary) and request the determined amount of funds to be transferred from the cashless wagering account to the EGM.

Following the mobile device application interacting with the EGM to facilitate the EGM requesting the determined amount of funds, the gaming establishment fund management system (or a component of the gaming establishment fund management system, such as the cashless wagering system), determines whether to authorize the transfer of the determined amount of funds. If the component of the gaming establishment fund management system determines not to authorize the determined amount of funds, the component of the gaming establishment fund management system communicates a denial to the EGM and/or the mobile device application, wherein the EGM and/or mobile device application display a denial of funds transfer to the user.

On the other hand, if the component of the gaming establishment fund management system determines to authorize the determined amount of funds, the component of the gaming establishment fund management system updates the gaming establishment account associated with the user and communicates an authorization to the EGM. For example, when funds are being transferred from a cashless wagering account to the EGM, the cashless wagering system reduces a balance of the cashless wagering account by the reduced amount of funds. The EGM proceeds with updating a credit balance of the EGM to account for the determined amount of funds. In certain embodiments, the EGM further proceeds with communicating a transfer of funds confirmation to the mobile device, wherein the mobile device application displays a confirmation of the transfer of the amount of funds and/or the updated credit balance of the EGM. Such a transferred amount of funds is then available for wagering by the player at the EGM.

It should be appreciated that while described as utilizing a mobile device running a mobile device application to access funds associated with different gaming establishment accounts and/or to access funds associated with one or more lines of credit issued to the user, in various embodiments, the system utilizes any suitable interface, such as an interface of the EGM, an interface of a remote host controlled service window displayed by an EGM, and/or an interface of a component of a gaming establishment patron management system, such as a player tracking unit, to enable the user at the EGM to access the funds associated with such gaming establishment accounts and/or to access funds associated with one or more lines of credit issued to the user.

In certain embodiments, following the use of zero, part or all of the transferred amount of funds at the EGM and upon receiving a "cash out" input from the player, part or all of the credit balance of the EGM is transferred to the gaming establishment account, such as the cashless wagering account independent of any attempt to repay the amount of funds outstanding on any activated lines of credit. In these embodiments, unlike prior systems which required that any amount cashed out from an EGM is automatically applied to repay the amount of funds outstanding on any activated lines of credit, the system does not mandate that any amount cashed out from an EGM is automatically applied to repay the amount of funds outstanding on any activated lines of credit. Rather, the system continues to monitor the outstanding line of credit balance prior to and after an amount of funds are cashed out from an EGM and enables such cashed out funds to flow to a gaming establishment account, such as a cashless wagering account, thereby reducing user tension by not having to continually activate the line of credit at each EGM played. In other words, to facilitate ease of line of credit fund movement from one EGM to another EGM, the gaming establishment fund management system tracks such line of credit funds as a separate balance eliminating the need to repeatedly reactivate a line of credit after each cash out event (thus saving the user time).

In certain embodiments, following one or more inputs to cash out a credit balance of an EGM to a gaming establishment account (which may be made in association with the EGM, in association with a component of the EGM or in association with a mobile device application of a mobile device paired to the EGM), the EGM (or a component of the EGM, such as the SMIB) operates with the gaming establishment fund management system (or a component of the gaming establishment fund management system, such as the cashless wagering system), to transfer the amount of funds of the credit balance of the EGM to the gaming establishment account, such as the cashless wagering account associated with the player.

In certain other embodiments, the system determines to facilitate the transfer of funds from the EGM to the gaming establishment account, such as the cashless wagering account, independent of any input by the player. In one such embodiment, if the system determines that no activity has occurred for a designated amount of time, as a precautionary measure, the system transfers the credit balance of the EGM from the EGM to the gaming establishment account used to transfer funds to the EGM. In another embodiment, if the system determines that another player is attempting to log onto the EGM, as a precautionary measure, the system transfers the credit balance of the EGM from the EGM to the gaming establishment account used to transfer funds to the EGM. Such transfers of the credit balance to the gaming establishment account is associated with a termination of the player's current gaming session.

In these embodiments, after a determination to transfer the credit balance of the EGM from the EGM to a gaming establishment, the EGM proceeds with operating with the gaming establishment fund management system (or a component of the gaming establishment fund management system, such as the cashless wagering system) to log the player into a gaming establishment account, such as a cashless wagering account associated with the player (or confirm that the player remains logged into the gaming establishment account) and request the determined amount of funds to be transferred from the EGM to the gaming establishment account. Following such a request, the EGM proceeds with updating a credit balance of the EGM to account for the determined amount of funds transferred from the EGM to the gaming establishment account. The gaming establishment system (or the component of the gaming establishment fund management system, such as the cashless wagering system) additionally updates the gaming establishment account associated with the player (e.g., the cashless wagering system adds the determined amount of funds to the cashless wagering account) and communicates a confirmation to the EGM. The EGM further proceeds with displaying a transfer of funds confirmation (and additionally or alternatively communicating a transfer of funds confirmation to the mobile device), wherein the EGM (and/or the mobile device application) displays a confirmation of the transfer of the amount of funds and/or the updated credit balance of the EGM. Such a transferred amount of funds is available in the gaming establishment account to be transferred to another gaming device (such as another EGM or a gaming table component) or another gaming establishment account, such as to a gaming establishment retail account.

It should be appreciated that since the amount of funds of the credit balance of the EGM are not utilized to pay back any outstanding line of credit but are transferred from the EGM to a gaming establishment account, the outstanding line of credit balance maintained by the gaming establishment fund management system (and/or maintained by the gaming establishment credit system) is not affected by the movement of funds between a gaming establishment account and one or more gaming devices. As such, the system disclosed herein reduces friction for the user (i.e., the user does not need to repeatedly reactivate the same line of credit) and promotes the user transitioning from one EGM to another without having to reactivate funds from their outstanding line of credit (which remain accessible in their gaming establishment account, such as their cashless wagering account). Additionally, by not requiring the automatic payment to an outstanding line of credit with each and every cash out from an EGM, the system enables the user to make a second withdrawal from the line of credit without having to satisfy the first withdrawal, thereby providing the user greater control over the funds represented by what is owed on the line of credit. Moreover, in addition to benefitting the user, the employment of a separate outstanding line of credit balance reduces the logistical burden on the system by not having to repeatedly activate, close and reactivate the same line of credit.

It should further be appreciated that while described in relation to an outstanding line of credit balance maintained throughout the transferring of funds between a gaming establishment account and an EGM, in different embodiments, the system maintains the outstanding line of credit balance throughout the transferring of funds between a gaming establishment account and a gaming table component associated with a gaming table. In one such embodiment, the gaming table is an intelligent gaming table which enables one or more players to play one or more suitable games by placing one or more wagers utilizing gaming chips. In this embodiment, the gaming table component is part of (or otherwise associated with) the intelligent gaming table and includes zero, one or more input devices (to receive inputs to facilitate the electronic transfer of funds to the gaming table component and from the gaming table component without requiring the automatic repayment of the outstanding line of credit balance), and zero, one or more display devices (to display information to the player and/or gaming establishment personnel regarding the electronic transfer of funds to the gaming table component and from the gaming table component without requiring the automatic repayment of the outstanding line of credit balance). In certain embodiments, the gaming table component additionally includes a communication interface (such as a wireless communication interface to communicate with a mobile device regarding the electronic transfer of funds to the gaming table component and from the gaming table component without requiring the automatic repayment of the outstanding line of credit balance) and/or a printer (to generate a receipt regarding the electronic transfer of funds to the gaming table component and from the gaming table component without requiring the automatic repayment of the outstanding line of credit balance).

In another such embodiment, the gaming table is a non-intelligent gaming table including a suitable support structure, such as one or more legs, a playing surface and a dealer position. In this embodiment, the gaming table component is separate from but associated with the gaming table and includes zero, one or more input devices (to receive inputs to facilitate the electronic transfer of funds to the gaming table component and from the gaming table component without requiring the automatic repayment of the outstanding line of credit balance), and zero, one or more display devices (to display information to the player and/or gaming establishment personnel regarding the electronic transfer of funds to the gaming table component and from the gaming table component without requiring the automatic repayment of the outstanding line of credit balance). In certain embodiments, the gaming table component additionally includes or is otherwise associated with a communication interface (such as a wireless communication interface to communicate with a mobile device regarding the electronic transfer of funds to the gaming table component and from the gaming table component without requiring the automatic repayment of the outstanding line of credit balance), a player identification device associated with the gaming table (such as a card reader to enable the player to log into the gaming table) and/or a printer (to generate a receipt regarding the electronic transfer of funds to the gaming table component and from the gaming table component without requiring the automatic repayment of the outstanding line of credit balance).

In another such embodiment, regardless of if an intelligent gaming table or a non-intelligent gaming table are utilized, the gaming table component is a mobile gaming table component associated with one or more of such gaming tables. In this embodiment, the mobile gaming table component is associated with gaming establishment personnel. For example, a tablet or mobile device associated with a gaming establishment mobile staff member qualifies as a mobile gaming table component. In these embodiments, the mobile gaming table component includes zero, one or more input devices (to receive inputs to facilitate the electronic transfer of funds to the gaming table component and from the gaming table component without requiring the automatic repayment of the outstanding line of credit balance), and zero, one or more display devices (to display information to the player and/or gaming establishment personnel regarding the electronic transfer of funds to the gaming table component and from the gaming table component without requiring the automatic repayment of the outstanding line of credit balance). The mobile gaming table component additionally includes or is otherwise associated with a communication interface (such as a wireless communication interface to communicate with a mobile device regarding the electronic transfer of funds to the gaming table component and from the gaming table component without requiring the automatic repayment of the outstanding line of credit balance), a player identification device associated with the gaming table (such as a card reader to enable the player to log into the gaming table) and/or a printer (to generate a receipt regarding the electronic transfer of funds to the gaming table component and from the gaming table component without requiring the automatic repayment of the outstanding line of credit balance).

In these embodiments, following a completion of a transfer of an amount of funds from a gaming establishment account associated with a user to a gaming table component, the gaming table component causes a display device to display instructions to gaming establishment personnel to issue the user an amount of gaming chips corresponding to the amount of transferred funds and/or causes a printer to generate a receipt with instructions to gaming establishment personnel to issue the identified user an amount of gaming chips corresponding to the amount of transferred funds. In one such embodiment, the gaming table component causes a display device of a dealer workstation to display instructions to a dealer to issue the user an amount of gaming chips corresponding to the amount of transferred funds. In another such embodiment, the gaming table component causes a display device of a mobile gaming table component, such as a mobile workstation associated with a gaming establishment mobile staff member, to display instructions to a gaming establishment staff member associated with the gaming table to issue the user an amount of gaming chips corresponding to the amount of transferred funds. Following providing instructions to gaming establishment personnel to issue the user an amount of gaming chips corresponding to the amount of transferred funds and following the gaming establishment personnel making one or more inputs indicating a completion of the issuance of the amount of gaming chips corresponding to the amount of transferred funds, the gaming table component causes a receipt to be generated associated with the issuance of the amount of gaming chips. In one such embodiment, the receipt is a physical receipt which the gaming establishment personnel deposited in a drop box or otherwise retains until submitted to the gaming establishment. In another such embodiment, the receipt is a virtual receipt which is communicated to one or more gaming establishment accounting servers.

It should be appreciated that in these embodiments, since the issuance of chips from an electronic transfer of funds to the gaming table must be accounted for when reconciling the transactions associated with the gaming table, the gaming table component causes the generation of a receipt to memorialize the electronic transaction. For example, if a dealer at a gaming table provides the user a quantity of gaming chips corresponding to the amount of funds electronically transferred from the user's gaming establishment account to the gaming table component, the dealer deposits the printed receipt into a dropbox at the gaming table such that at the end of the dealer's shift, the gaming chip tray is balanced when accounting for the cash which the dealer exchanged for gaming chips and the electronic fund transfers which the dealer exchanged for gaming chips. In another example, if a gaming establishment mobile staff member servicing an area with multiple gaming tables provides a user a quantity of gaming chips corresponding to the amount of funds electronically transferred from the user's gaming establishment account to the mobile gaming table component carried by the mobile staff member, the mobile staff member deposits the printed receipt into a pouch or folder they carry with them such that at the end of the mobile staff member's shift, the gaming chips initially provided to the mobile staff member is balanced when accounting for the cash which the mobile staff member exchanged for gaming chips and the electronic fund transfers which the mobile staff member exchanged for gaming chips.

Repaying of Activated Line of Credit

In various embodiments, in addition to funding a gaming establishment account with an amount of funds associated with an issued line of credit and enabling such funds to be cashed out from a credit balance of an EGM to a gaming establishment account, the system monitors for an occurrence of a line of credit repayment event. In these embodiments, upon a line of credit repayment event, the system attempts to repay part or all of the outstanding line of credit balance. Specifically, upon an occurrence of a line of credit repayment event, the gaming establishment fund management system (or a component of the gaming establishment fund management system, such as the cashless wagering system) communicates one or more messages to the gaming establishment credit system to log the user into the gaming establishment credit system (if necessary) and attempts to pay back an amount of funds accessed from the issued line of credit of the user. Upon receiving the messages and verifying the request, the gaming establishment credit system proceeds with operating with the gaming establishment fund management system (or a component of the gaming establishment fund management system, such as the cashless wagering system), to log the user into a gaming establishment account associated with the user (if necessary) and potentially transfer the amount of funds accessed from the issued line of credit of the user from the gaming establishment account associated with the user to the gaming establishment credit system to pay off part or all of the outstanding line of credit balance.

In certain embodiments, to complete a transfer of an amount of funds associated with a line of credit from a gaming establishment account, the gaming establishment fund management system determines whether to authorize the transfer of the determined amount of funds to pay off part or all of the issued line of credit. In these embodiments, if the gaming establishment fund management system determines not to authorize the transfer of the determined amount of funds to pay off the issued line of credit (e.g., the gaming establishment account balance lacks the funds to pay off part or all of the issue line of credit), the gaming establishment fund management system communicates a denial to the gaming establishment credit system. In certain embodiments, following the denial, one or more display devices display a denial of line of credit payoff to the user.

On the other hand, if the gaming establishment fund management system determines to authorize the transfer of the determined amount of funds to pay off part or all the issued line of credit (e.g., the gaming establishment account balance has adequate funds to pay off part or all of the issue line of credit), the gaming establishment fund management system updates the outstanding line of credit balance (to reflect a paying off of part or all of the issued line of credit), updates the balance of the gaming establishment account (to reflect the transfer of the funds away from the gaming establishment account) and communicates an authorization of the transfer to the gaming establishment credit system. Upon receiving the authorization, the gaming establishment credit system updates the outstanding line of credit. As such, upon an amount of funds previously activated from a line of credit being repaid, the amount of funds paid back to close part or all of the line of credit is not only subtracted from any funds residing in the gaming establishment account, such as a cashless wagering account, but the amount of funds from the line of credit is separately subtracted from the outstanding line of credit balance.

In certain embodiments, a line of credit repayment event occurs responsive to one or more inputs made by the user indicating a repayment of part or all of an outstanding line of credit. In these embodiments, the user may make such inputs via any suitable interface at any suitable device such as via a kiosk, via a mobile device application, and/or via a web interface, wherein such inputs trigger the line of credit repayment event and the gaming establishment fund management system operating with the gaming establishment credit system to repay part or all of one or more outstanding lines of credit. In certain embodiments, a line of credit repayment event occurs responsive to one or more inputs made by an operator of the system indicating a request for a repayment of part or all of an outstanding line of credit. In these embodiments, the operator may make such inputs via any suitable interface at any suitable device such as via a device at a gaming establishment cage, via an operator work station and/or via a web interface, wherein such inputs trigger the line of credit repayment event and the gaming establishment fund management system operating with the gaming establishment credit system to repay part or all of one or more outstanding lines of credit.

In certain embodiments, a line of credit repayment event occurs responsive to one or more events occurring in association with the gaming establishment fund management system. In these embodiments, the gaming establishment fund management system (or a component of the gaming establishment fund management system, such as the cashless wagering system) determines that a line of credit repayment event occurs at a designated interval, such as every hour, every 24 hours, every week, when the gaming establishment's "end of day" occurs or a date/time when repayment of the line of credit is required, wherein such events trigger the line of credit repayment event and the gaming establishment fund management system operating with the gaming establishment credit system to repay part or all of one or more outstanding lines of credit. In certain embodiments, a line of credit repayment event occurs responsive to one or more notifications being received by the gaming establishment fund management system. In these embodiments, the gaming establishment fund management system (or a component of the gaming establishment fund management system, such as the cashless wagering system) determines that a line of credit repayment event occurs upon receiving a notification associated with a user having an outstanding line of credit, such as upon a player with a positive outstanding line of credit balance checking out of their hotel room or upon a player with a positive outstanding line of credit balance ending their trip to the gaming establishment, wherein such notifications trigger the gaming establishment fund management system operating with the gaming establishment credit system to repay part or all of one or more outstanding lines of credit.

In certain embodiments, a line of credit repayment event occurs responsive to one or more events occurring in association with the gaming establishment credit system. In these embodiments, the gaming establishment credit system determines that a line of credit repayment event occurs at a designated interval, such as every hour, every 24 hours, every week, when the gaming establishment's "end of day" occurs or a date/time when repayment of the line of credit is required, wherein such events trigger the line of credit repayment event and the gaming establishment credit system attempting to operate with the gaming establishment fund management system to repay part or all of one or more outstanding lines of credit. In certain embodiments, a line of credit repayment event occurs responsive to one or more notifications being received by the gaming establishment credit system. In these embodiments, the gaming establishment credit system determines that a line of credit repayment event occurs upon the gaming establishment credit system receiving a notification associated with a user having an outstanding line of credit, such as upon a player with a positive outstanding line of credit balance checking out of their hotel room or upon a player with a positive outstanding line of credit balance ending their trip to the gaming establishment, wherein such notifications trigger the gaming establishment credit system attempting to operate with the gaming establishment fund management system to repay part or all of one or more outstanding lines of credit.

In certain embodiments, a line of credit repayment event occurs responsive to a deposit of an amount of funds to a gaming establishment account, such as a cashless wagering account. In certain such embodiments, the system determines if a line of credit repayment event occurs upon a deposit of an amount of funds to a gaming establishment account based on the device utilized to make such a deposit. That is, the system can determine what type of device is performing the deposit and whether the deposit with that type of device warrants an occurrence of a line of credit repayment event. For example, if an amount of funds is deposited to a gaming establishment account from an EGM, the system may assume that this deposit action is the result of a cash-out and this can then trigger (possibly with the player's prior authorization) an attempt to repay some or all of the outstanding balance of the line of credit from the amount transferred from the EGM to the gaming establishment account. It should be appreciated that since, as described below, an amount may be deposited into a gaming establishment as a player directed non-cash out action via an interface of an EGM, in certain embodiments, the system determines if a line of credit repayment event occurs upon a deposit of an amount of funds to a gaming establishment account based on the device utilized to make such a deposit and one or more actions undertaken at that device.

Additional Sourcing of Funds Transferred to Gaming Establishment Fund Management Account In various embodiments, in addition to funding a gaming establishment account with an amount of funds associated with an issued line of credit, the system enables the gaming establishment account to be funded from one or more additional sources.

In certain embodiments, the gaming establishment fund management account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment fund management account is associated with a gaming establishment or a group of gaming establishments, wherein the user establishes a gaming establishment fund management account by a deposit of funds (such as at a kiosk) to be subsequently utilized in association with the mobile device application. In other embodiments, the gaming establishment fund management account is funded via a mobile device electronic fund transfer, such using Apple Pay™ or Android Pay™. It should be appreciated that in different embodiments, the system utilizes a mobile device running a mobile device application, a kiosk, an EGM, a gaming table component, a remote host controlled service window displayed and/or a gaming establishment interface to facilitate the transfer of funds from a third-party account.

In certain embodiments, the system enables funds to be deposited in a gaming establishment fund management account via a gaming device, such as an EGM. In certain embodiments, the system enables a user that has an amount of cash to utilize a gaming device to convert the cash to an amount deposited into a gaming establishment fund management account (which may be subsequently transferred utilizing a mobile device application). In other embodiments, the system enables funds to be deposited in a gaming establishment fund management account via a gaming device that accepts printed ticket vouchers. In these embodiments, the system enables a user that has one or more printed ticket vouchers to utilize a gaming device to convert the printed ticket voucher to an amount deposited into a gaming establishment fund management account (which may be subsequently transferred utilizing a mobile device application).

In certain embodiments, the system enables funds to be deposited in a gaming establishment fund management account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment fund management account (which may be subsequently transferred utilizing a mobile device application). In other embodiments, the system enables funds to be deposited in a gaming establishment fund management account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment fund management account (which may be subsequently transferred utilizing a mobile device application).

In certain embodiments, the system enables funds to be deposited in a gaming establishment fund management account via a kiosk that accepts money. In certain embodiments, the system enables a user that has an amount of cash to utilize a kiosk to convert the cash to an amount deposited into a gaming establishment fund management account (which may be subsequently transferred to a gaming device utilizing a mobile device application). In other embodiments, the system enables funds to be deposited in a gaming establishment fund management account via a kiosk that accepts printed ticket vouchers. In certain embodiments, the system enables a user that has one or more printed ticket vouchers to utilize a kiosk to convert the printed ticket voucher to an amount deposited into a gaming establishment fund management account (which may be subsequently transferred to a gaming device utilizing a mobile device application).

In certain embodiments, the gaming establishment fund management account is associated with funds associated with one or more virtual ticket vouchers. In certain embodiments, the system enables a user associated with an amount of virtual ticket vouchers to utilize a gaming device (e.g., an EGM, a component of an EGM) a mobile device running a mobile device application, a kiosk and/or a gaming establishment interface to convert the virtual ticket vouchers to an amount deposited into a gaming establishment fund management account.

In certain embodiments, the system enables a user to fund the gaming establishment fund management account independent of the mobile device and independent of the mobile device application. In certain other embodiments, the system enables a user to utilize a mobile device running a mobile device application to fund the gaming establishment fund management account. More specifically and utilizing the example of a kiosk, in one embodiment, to utilize a mobile device and a kiosk to facilitate the funding of a gaming establishment fund management account, the user wirelessly pairs or otherwise connects a mobile device with a kiosk. In one example embodiment, the user moves the mobile device into the range of a wireless receiver of the kiosk. The kiosk and the launched or activated mobile device application of the mobile device negotiate a secure, authenticated connection with the proper functionality, versions and security settings. It should be appreciated that the kiosk wirelessly connects with the mobile device running the mobile device application in the same or similar fashion to how a mobile device is paired or connected with a gaming device of the present disclosure.

After connecting the mobile device to the kiosk, the kiosk prompts the user to deposit an amount of funds into the kiosk. In one such embodiment, the kiosk prompts the user to insert one or more bills into a bill acceptor of the kiosk. In another such embodiment, the kiosk additionally or alternatively prompts the user to deposit a physical ticket voucher (associated with an amount of funds) into the kiosk. In another such embodiment, the kiosk additionally or alternatively prompts the user to deposit a card associated with an external account, such as a credit card or debit card into the kiosk. In another such embodiment, the kiosk additionally or alternatively prompts the user to enter information associated with an external account, such as a credit card account, a PayPal® account, a Venmo® account, or a debit card account into the kiosk. In another such embodiment, the kiosk additionally or alternatively prompts the user to deposit an amount of funds into the kiosk using a mobile device electronic fund transfer, such using Apple Pay™ or Android Pay™.

In one embodiment, after a first amount of funds is accepted, such as after a first bill or unit of currency is accepted, by the kiosk, the kiosk and/or the mobile device application enable the user to transfer the deposited amount of funds (e.g., a "Load Phone Now" button) or continue to deposit additional amounts of funds with the kiosk. In another embodiment, for each amount of funds accepted by the kiosk, such as for each bill or unit of currency accepted by the kiosk, a virtual ticket voucher is created and deposited in the gaming establishment fund management account.

In certain embodiments, upon receiving an amount of funds from the user and the user indicating to transfer the deposited amount of funds in association with the mobile device application, the kiosk communicates with one or more servers to transfer an amount of money to a gaming establishment fund management account (to be drawn upon from the mobile device application of the present disclosure). In another such embodiment, upon receiving an amount of funds from the user and the user indicating to transfer the deposited amount of funds in association with an account or balance associated with the mobile device application, the kiosk communicates with one or more servers, such as a virtual ticket voucher server, to create a virtual ticket voucher associated with the amount of received currency. The system of the present disclosure transfers the created virtual ticket voucher to the gaming establishment fund management account.

Linking Mobile Device to Gaming Device

In certain embodiments, as indicated above, prior to enabling a user, such as a player, to take any action related to the system (such as using a mobile device to facilitate the access of funds associated with an issued line of credit and causing a transfer of such funds from a cashless wagering account to a gaming device), a pairing or linkage occurs between the mobile device and the gaming device, such as the EGM. The pairing or linkage between the mobile device and the gaming device occurs via one or more applications being run or executed on the mobile device.

In certain embodiments, after a user has opened an application on a mobile device, logged into the application (if required) and selected an action to be performed (such as accessing a line of credit from the mobile device), the system determines if the mobile device application is associated with an active authorization token previously created by the system. In these embodiments, an authorization token is a time-based token which expires after a designated period of time and which is associated with an additional level of user authentication beyond a user's application username and application password.

If the system determines that the application is not associated with an active authorization token previously created by the system, the mobile device application prompts the user to provide identifying information, such as a personal identification number or biometric identifier. The mobile device application stores the provided identifying information as mobile device encrypted data. Following the user providing identifying information, the mobile device application prompts the user to cause the mobile device to engage the gaming device (e.g., the EGM, a component of the EGM), such as prompting the user to tap the mobile device to a designated portion of the EGM. It should be appreciated that any reference herein to a user tapping the mobile device to a designated portion of the gaming device may or may not include the user pressing a fingerprint scanner (if the mobile device is equipped with such a fingerprint scanner) while concurrently engaging the gaming device. In other embodiments, the mobile device application verifies the identifying information of the user by communicating with a verification/authentication server over one or more wireless communication protocols, such as WiFi protocol, a cellular communication protocol, to obtain the active authorization token.

In certain embodiments, following the user causing the mobile device to engage the gaming device (e.g., the user taps the mobile device to a player tracking card reader or other designated location(s) of an EGM), the mobile device application communicates, via a wireless communication protocol, the provided identifying information and the requested action to be performed to the gaming device. For example, upon the user tapping the mobile device to a player tracking card reader or other designated location(s) of the EGM (or otherwise moving the mobile device to within a designated distance of the player tracking card reader or other designated locations(s) of the EGM), the mobile device application sends the identifying information and the requested action to a component of a gaming establishment management system located inside the EGM, such as a NexGen® player tracking component of an IGT Advantage® system. NexGen® and IGT Advantage® are trademarks of IGT, the Applicant of the present application.

Following the communication of the identifying information and the requested action to the gaming device, the system determines if the identifying information is valid. For example, a designated system component configured to operate with a player tracking system determines whether the identifying information is valid.

If the system determines that the identifying information is invalid, the system communicates an invalid identifying information response to the mobile device. For example, an identifying information status message is communicated to the mobile device which reports whether the identifying information is valid or invalid. The mobile device application then displays one or more messages regarding the invalid identifying information and prompts the user to provide identifying information, such as a personal identification number or biometric identifier. In certain such embodiments, if the mobile device receives a communication that the identifying information is invalid (or alternatively in association with the initial creation of a token) and if the mobile device includes a fingerprint scanner, the mobile device application prompts the user to press the fingerprint scanner while engaging the gaming device, such as tapping the mobile device to a designated portion of an EGM.

On the other hand, if the system determines that the identifying information is valid, the system creates an authorization token. The system associates the authorization token with a timestamp of when the authorization token will expire. In certain embodiments, a cashless system includes a key distribution center which generates a session key to encrypt all cashless messages. The session key is rotated periodically at a configurable rate from 1 hour to 24 hours. In these embodiments, the system utilizes this session key to sign the token data and create a token. As such, the token time-to-live will be less than or equal to the session key rotation period. In other embodiments, such authorization tokens are managed utilizing software (and not a key distribution center).

In certain embodiments, the authorization token expires after a designated period of time as an additional level of security in the transfer of fund data to/from the EGM component which is facilitated the mobile device. Such a designated amount of time which an authorization token remains valid enables the user to move from one gaming device (e.g., one gaming table associated with one gaming table component) to another gaming device (e.g., another gaming table associated with another gaming table component) and, transfer funds to/from each gaming device and a gaming establishment account, without having to reprovide such identifying information each time the user switches gaming devices. That is, the mobile device application of the present disclosure is configured to communicate with one or more gaming devices (without having to reauthenticate itself repeatedly) during the designated amount of time which the authorization token remains valid.

Following the creation of an authorization token, the system communicates the created authorization token to the mobile device, such as via one or more messages including the created authorization token, for storage by the mobile device application and proceeds with executing one or more of the requested actions and communicating a requested action response to the mobile device. For example, upon the creation of the authorization token, the component of a gaming establishment management system located inside the gaming device, such as a NexGen® player tracking component of an IGT Advantage® system, communicates the created authorization token to the mobile device and proceeds with executing the requested action.

On the other hand, following a determination that the mobile device application is associated with a previously created and stored authentication token, the mobile device application prompts the user to cause the mobile device to engage the gaming device, such as prompting the user to tap the mobile device to a designated portion of the EGM.

Following the user causing the mobile device to engage the gaming device (e.g., the user taps the mobile device to a player tracking card reader or other designated location(s) of the EGM), the mobile device application communicates, via a wireless communication protocol, the previously stored authorization token and the requested action to be performed to the gaming device. For example, upon the user tapping the mobile device to a player tracking card reader or other designated location(s) of an EGM, the mobile device application sends the stored authorization token and the requested action to a component of a gaming establishment management system located inside the EGM, such as a NexGen® player tracking component of an IGT Advantage® system.

Following the communication of the stored authorization token and the requested action to the gaming device, the system determines if the communicated authorization token is still valid. For example, a system component configured to operate with a player tracking system determines whether the authorization token is valid (i.e., active and non-expired).

If the system determines that the communication authorization token is invalid, the system communicates an invalid authorization token response to the mobile device. The mobile device application then displays one or more messages regarding the invalid authorization token and prompts the user to provide identifying information, such as a personal identification number or biometric identifier, to obtain another authentication token.

On the other hand, if the system determines that the stored authorization token is valid, the system proceeds with executing the requested action. For example, upon the determination that the communicated authorization token is valid, the component of a gaming establishment management system located inside the EGM proceeds with executing the requested action and communicates a requested action response to the mobile device.

In certain embodiments, the system enables a user to interact with the gaming device via the mobile device, without having to continually reengage the gaming device with the mobile device for each requested action. In these embodiments, after initially establishing a secure connection with the gaming device, subsequent interactions between the mobile device application and the gaming device occur without any subsequent physical interaction between the mobile device and the gaming device. That is, to avoid having the user retrieve the mobile device and repeat the physical operation of engaging the gaming device with the mobile device, certain embodiments enable the user to execute one or more functions without repeating the above-described physical operation of engaging the gaming device with the mobile device. In certain such embodiments, the mobile device application utilizes one or more display devices of the gaming device to display to the user information and/or user selectable prompts which are otherwise displayable via the display device of the mobile device.

In certain other embodiments, for each interaction or requested action between the gaming device and the mobile device, the system requires the user to reengage the gaming device with the mobile device to reestablish or confirm the pairing between the gaming device and the mobile device. In certain other embodiments, for each interaction between the gaming device and the mobile device that occur a designated amount of time after the last engagement of the gaming device with the mobile device, the system requires the user to reengage the gaming device with the mobile device to reestablish or confirm the pairing between the gaming device and the mobile device.

Utilizing Paired Mobile Device Application

In various embodiments, after pairing the mobile device with the EGM or the component of the EGM, the mobile device application communicates one or more requested actions to be performed. Such requested actions generally pertain to an action associated with a user account, or an action associated with an initiation of a transfer of funds. It should be appreciated that while certain data or information pertaining to one or more of the requested actions are communicated from an EGM or a component of the EGM to a mobile device, such data or information may additionally or alternatively be communicated: (i) from one or more servers to a mobile device via one or more wireless communication protocols, or (ii) from an EGM to one or more servers via one or more wireless communication protocols and then from one or more servers to a mobile device via one or more wireless communication protocols.

User Accounts

In certain embodiments, the action to be performed includes enabling the user to log into a casino loyalty account, such as a player tracking account, via a wireless communication protocol, utilizing the mobile device application.

In certain embodiments, the action to be performed includes enabling the user to log out of a casino loyalty account, such as a player tracking account, via a wireless communication protocol, utilizing the mobile device application. In different embodiments, upon receiving one or more "cash out" inputs from the user, if the system determines that no activity has occurred for a designated amount of time, or if the system determines that another user is attempting to log in, the mobile device application facilitates a logging out of the casino loyalty account. Such logging out of the casino loyalty account is associated with a termination of the user's current gaming session. Specifically, the gaming device (e.g., an EGM or a component of the EGM) proceeds with operating with a user loyalty system (i.e., a player tracking system) to log the user out of the user loyalty account to complete the player tracking session at the gaming device In certain embodiments, the action to be performed additionally or alternatively includes enabling the user to log into a gaming establishment account, such as a cashless wagering account, via a wireless communication protocol, utilizing the mobile device application. In certain such embodiments, following the user selecting an image associated with an electronic casino loyalty account card stored via a digital wallet application or following the mobile device application retrieving data associated with a gaming establishment account stored via a digital wallet application, the mobile device application prompts the user to cause the mobile device to engage the gaming device, such as prompting the user to tap the mobile device to a card reader or other designated location(s) of the gaming device. After such engagement (or after the launching of the mobile device application if no mobile device to gaming device engagement is required), the mobile device application communicates, via a wireless communication protocol, user gaming establishment account data stored by the mobile device to the gaming device. The gaming device proceeds with operating with the gaming establishment fund management system to log the user into a gaming establishment account associated with the user. In one embodiment, the system determines a balance of the gaming establishment account (in terms of both cashable credits and non-cashable credits) associated with the user and causes the gaming device to communicate, via one or more wireless communication protocols, the determined gaming establishment account balance to the mobile device.

Fund Transfers

In certain embodiments, as described above, the action to be performed additionally or alternatively includes enabling the user to facilitate the transfer of funds from a gaming establishment account to the gaming device (e.g., an EGM or a component of the EGM) utilizing the mobile device application.

In certain embodiments, the action to be performed additionally or alternatively includes enabling the user to transfer funds from a virtual ticket voucher to the gaming device utilizing the mobile device application. In certain embodiments, following the launching of the mobile device application, such as following the user selecting an image associated with an electronic casino loyalty account card stored via a digital wallet application, the mobile device application determines an amount of funds to be transferred to the gaming device via the redemption of a virtual ticket voucher. In these embodiments, the mobile device application displays to the user images representing any virtual ticket vouchers associated with the mobile device. The mobile device application enables the user to select one or more images representing one or more virtual ticket vouchers associated with the mobile device. In these embodiments, similar to as described above with respect to the transfer of funds from a gaming establishment account to a gaming device via a mobile device application, following the determination of which virtual ticket vouchers are to be transferred from the mobile device application to the gaming device, the mobile device application prompts the user to cause the mobile device to engage the gaming device. The mobile device application then communicates, via a wireless communication protocol, data associated with the selected virtual ticket voucher to be transferred. The gaming device then communicates with one or more servers, such as a virtual ticket voucher server, to request the selected virtual ticket voucher (and more specifically the amount of funds associated with the selected virtual ticket voucher) be transferred from to the gaming device. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the gaming device proceeds with updating a balance of the gaming device (attributable to the user and redeemable for gaming chips) to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the user.

In certain embodiments, the action to be performed additionally or alternatively includes transferring non-cashable credits to the gaming device utilizing the mobile device application. In various embodiments, the system includes transferring non-cashable credits to a gaming device in association with a fund transfer to a cashless wagering account from a gaming establishment retail account which is part of a gaming establishment retail system.

Securing Transactions Between Mobile Device and Gaming Device

While the facilitation of the transfer of funds to and from a gaming device via a mobile device has many advantages described herein, certain security concerns arise when transferring fund data wirelessly between a gaming device and a mobile device (or between a gaming device and the mobile device via one or more servers). For example, a malicious person may attempt to intercept such a wireless communication and steal the funds being transferred. Such a malicious person may devise electronics, such as an antenna or other electronics placed on or near the gaming device to insert their mobile device between a "cash out" input and the mobile device engaging the gaming device.

More specifically, when facilitating the transfer of deposited funds and/or an amount of winnings from the gaming device to a gaming establishment account via the mobile device application, a user initiates an engagement of the gaming device with the mobile device, such as tapping the mobile device to a player tracking card reader or other designated location(s) of the gaming device. However, before the engagement of the gaming device with the user's mobile device is complete, an intruder utilizes such devised electronics to beat the user to the completion of the engagement. In this example, when the user subsequently actuates a "cash out" button on the gaming device, the gaming device proceeds with transferring the amount of the credit balance of the mobile device of the intruder. Such a concern is also present when a user attempts to wirelessly transfer funds to a gaming device via a mobile device wherein the intruder device intercepts such a transfer and reroutes the funds to the mobile device of the intruder.

In view of these security concerns, certain embodiments of the present disclosure utilize a time window, such as ten seconds, in association with one or more requested actions. In one such embodiment, after receiving an initiation of an engagement of the gaming device with the mobile device, the gaming device assigns or otherwise associates a time window with such an engagement. If one mobile device is attempted to be paired with the gaming device within the associated time window before an action is requested, the gaming device determines that only one mobile device is communicating with the gaming device and the gaming device proceeds with executing the requested action, such as a requested fund transfer of the present disclosure. On the other hand, if more than one mobile device is attempted to be paired with the gaming device within the associated time window before an action is requested, the gaming device determines that an intruder device may be present. In such a situation, the gaming device cancels the requested action and/or prompts the user to reengage the gaming device with the mobile device.

In another such embodiment, after receiving a requested action from the mobile device, the gaming device assigns or otherwise associates a time window with such a requested action. Following the requested action, if one mobile device is attempted to be paired with the gaming device within the associated time window, the gaming device determines that only one mobile device is communicating with the gaming device and the gaming device proceeds with executing the requested action, such as a requested fund transfer of the present disclosure. On the other hand, following the requested action, if more than one mobile device is attempted to be paired with the gaming device within the associated time window, the gaming device determines that an intruder device may be present. In such a situation, the gaming device cancels the requested action and/or prompts the user to reengage the gaming device with the mobile device.

It should be appreciated that in addition to thwarting an isolated attempt by an intruder to intercept a wireless fund transfer, the system is configured to identify if a device is involved in multiple attempted engagements with a gaming device over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

It should be appreciated that the mobile device facilitated fund data transfers of the present disclosure may occur in addition to or as an alternative from cash-based fund transfers and/or ticket voucher-based fund transfers. In one such embodiment, an amount of funds transferred to an EGM is funded via any of a mobile device facilitated fund transfer, a cash-based fund transfer or a ticket voucher-based fund transfer. In another embodiment, an amount of funds transferred from an EGM is cashed out via any of a mobile device facilitated fund transfer, a cash-based fund transfer or a ticket voucher-based fund transfer. In another embodiment, an amount of funds transferred to an EGM is funded via a mobile device facilitated fund transfer or a cash-based fund transfer (but is not funded via any ticket voucher-based fund transfer). In another embodiment, an amount of funds transferred from an EGM is cashed out via a mobile device facilitated fund transfer or a cash-based fund transfer (but is not cashed out via any ticket voucher-based fund transfer). In another embodiment, an amount of funds transferred to an EGM is funded via a mobile device facilitated fund transfer or a ticket voucher-based fund transfer (but is not funded via any cash-based fund transfer). In another embodiment, an amount of funds transferred from an EGM is cashed out via a mobile device facilitated fund transfer or a ticket voucher-based fund transfer (but is not cashed out via any cash-based fund transfer). In another embodiment, an amount of funds transferred to an EGM is funded via a mobile device facilitated fund transfer (but is not funded via a cash-based fund transfer nor a ticket voucher-based fund transfer). In another embodiment, an amount of funds transferred from an EGM is cashed out via a mobile device facilitated fund transfer (but is not cashed out via a cash-based fund transfer nor a ticket voucher-based fund transfer).

It should be further appreciated that any functionality or process of the present disclosure may be implemented via one or more servers, one or more EGMs, one or more components of an EGM, one or more gaming table components, one or more gaming establishment components (such as a component of a gaming establishment management system (e.g., a player tracking unit) supported by or otherwise located inside the gaming table component), or a mobile device application. For example, while certain data or information of the present disclosure is explained as being communicated from an EGM, a component of an EGM, a gaming table component or a gaming establishment component (such as a component of a gaming establishment management system (e.g., a player tracking unit) supported by or otherwise located inside the gaming table component) to a mobile device via one or more wireless communication protocols, such data or information may additionally or alternatively be communicated from one or more servers to a mobile device via one or more wireless communication protocols. Accordingly: (i) while certain functions, features or processes are described herein as being performed by an EGM, a component of an EGM, or a gaming table component, such functions, features or processes may alternatively be performed by one or more servers, or one or more mobile device applications, or one or more gaming establishment components (such as a component of a gaming establishment management system (e.g., a player tracking unit) supported by or otherwise located inside the gaming table component), (ii) while certain functions, features or processes are described herein as being performed by one or more mobile device applications, such functions, features or processes may alternatively be performed by one or more servers, one or more EGMs, one or more components of an EGM, one or more gaming table components, or one or more gaming establishment components (such as a component of a gaming establishment management system (e.g., a player tracking unit) supported by or otherwise located inside the gaming table component), (iii) while certain functions, features or processes are described herein as being performed by one or more servers, such functions, features or processes may alternatively be performed by one or more EGMs, one or more components of an EGM, one or more gaming table components, one or more mobile device applications, or one or more gaming establishment components (such as a component of a gaming establishment management system (e.g., a player tracking unit) supported by or otherwise located inside the gaming table component)), and (iv) while certain functions, features or processes are described herein as being performed by one or more gaming establishment components (such as a component of a gaming establishment management system (e.g., a player tracking unit) supported by or otherwise located inside the gaming table component), such functions, features or processes may alternatively be performed by one or more EGMs, one or more components of an EGM, one or more gaming table components, or one or more mobile device applications, or one or more servers.

EGM Components

In certain embodiments, the above-described embodiments of the present disclosure may be implemented in accordance with or in conjunction with an EGM.

Figure 3:
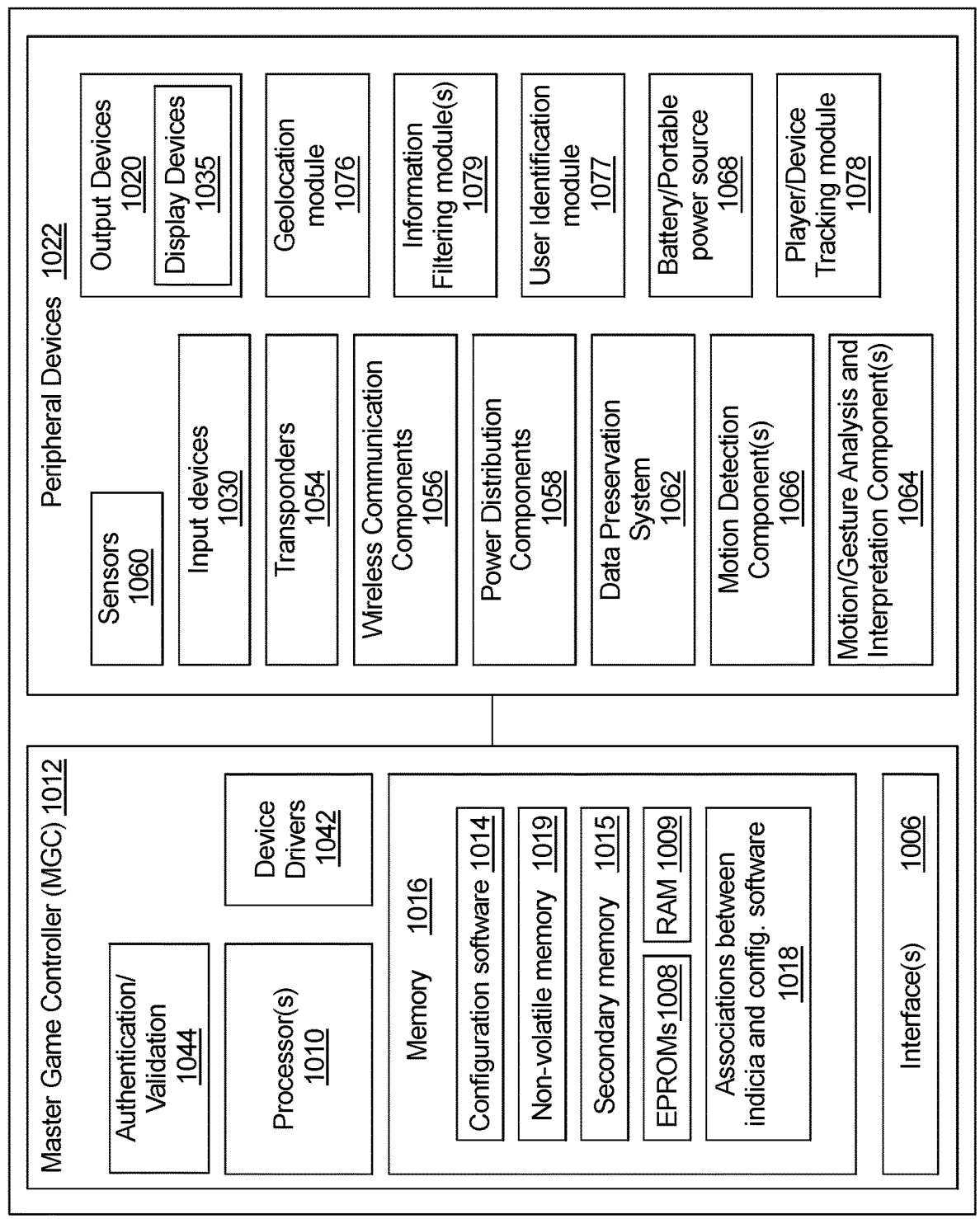
FIG. 3 is a schematic block diagram of one embodiment of an electronic configuration of an example electronic gaming machine.
Figure 4A:
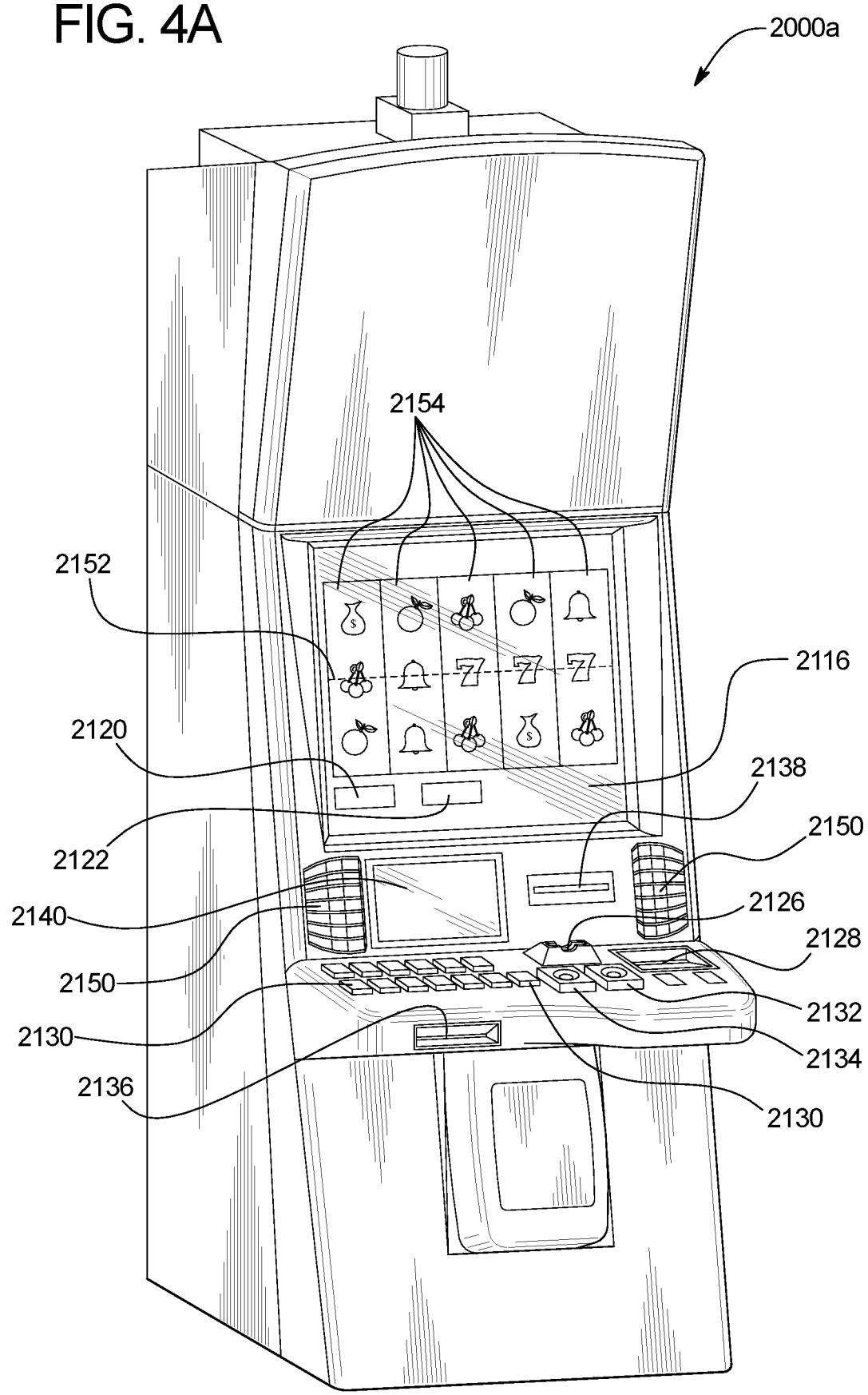
FIGS. 4A and 4B are perspective views of example alternative embodiments of an example electronic gaming machine.
Figure 4B:
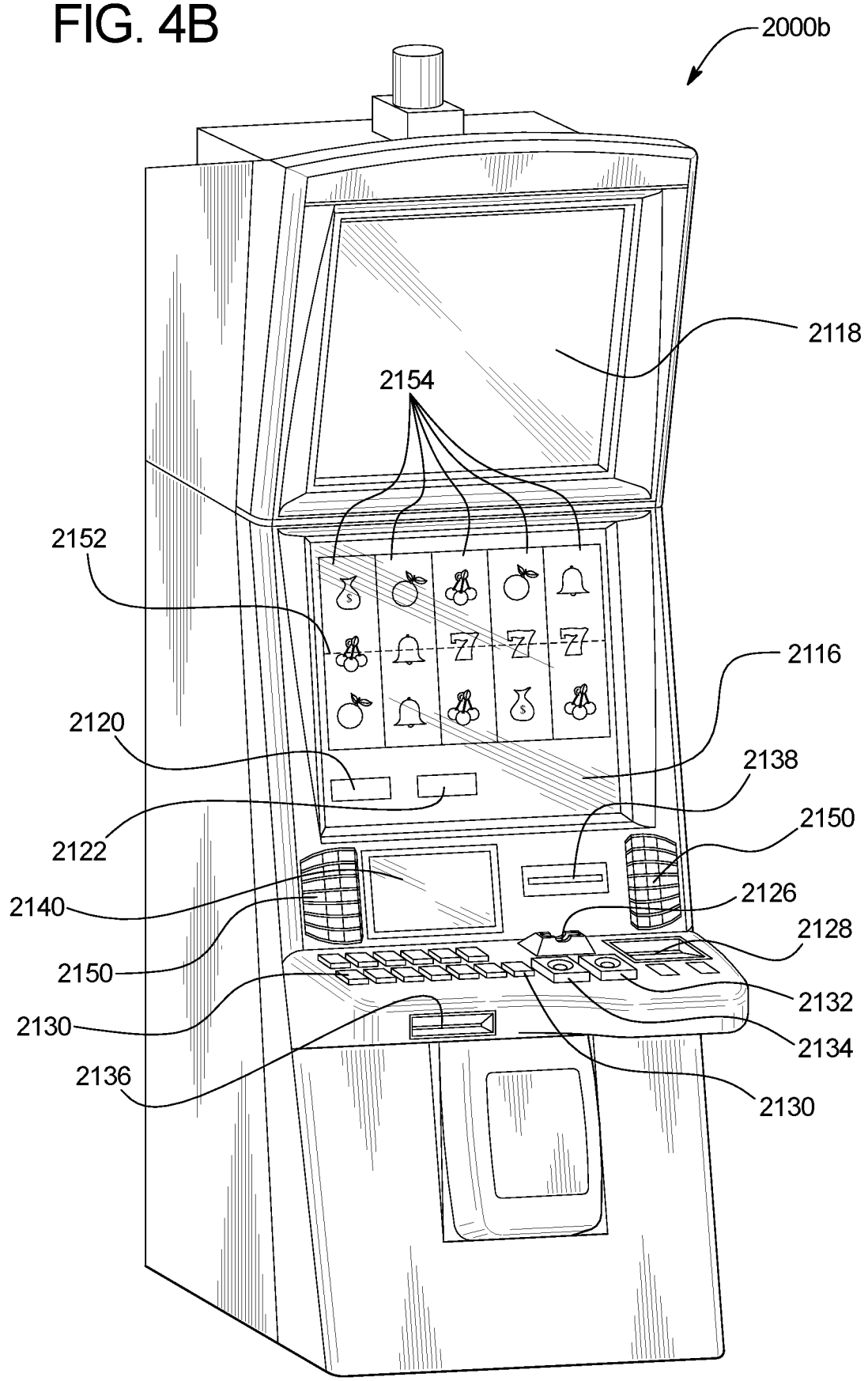

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal devices may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 1000 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all EGMs, and these example EGMs may not include one or more elements that are included in other EGMs. For example, certain EGMs include a coin acceptor while others do not.

Differentiating Certain Gaming Devices from General Purpose Computing Devices

It should be appreciated that certain of the gaming devices (e.g., EGMs and/or gaming table components) include certain components and/or are configured to operate in certain manners that differentiate these systems from general purpose computing devices (i.e., certain personal devices such as desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as a series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A gaming establishment fund management system comprising:
    a communication interface;
    a processor; and
    a memory device that stores a plurality of instructions that, when executed by the processor after an establishment of a line of credit with a gaming establishment credit system, cause the processor to:
        during a first period of time and responsive to a computing component of the gaming establishment credit system confirming an occurrence of a line of credit activation event:
            increase a gaming establishment cashless wagering account based on a first amount of funds drawn from the line of credit, and
            increase an outstanding line of credit balance based on the first amount of funds, wherein the outstanding line of credit balance is maintained separate from the gaming establishment cashless wagering account and maintained separate from the computing component of the gaming establishment credit system, during a second period of time that occurs after the first period of time, prior to a repayment of the first amount of funds drawn from the line of credit, and following a transfer of at least a portion of the first amount of funds to a credit balance of an electronic gaming machine, and responsive to a request, made when a door of a housing of the electronic gaming machine is closed, to transfer a second amount of funds from the credit balance of the electronic gaming device to the gaming establishment cashless wagering account, increase the gaming establishment cashless wagering account based on the second amount of funds, wherein the transfer of at least the portion of the first amount of funds to the credit balance of the electronic gaming machine comprises a serial communication, via the communication interface, of data to a slot machine interface board operable with a master gaming controller of the electronic gaming machine, a receipt, via the communication interface, of data associated with a detection, by a security sensor supported by the housing of the electronic gaming machine, that the door of the housing of the electronic gaming machine is open prevents the transfer of the second amount of funds from the credit balance of the electronic gaming device to the gaming establishment cashless wagering account, and the increase of the gaming establishment cashless wagering account during the second period of time occurs independent of the computing component of the gaming establishment credit system to minimize data transmissions based on the line of credit via not communicating any data to the computing component of the gaming establishment credit system that results in any modification of the outstanding line of credit balance and via not communicating any data to the computing component of the gaming establishment credit system that result in causing any transfer of any portion of the second amount of funds to repay any portion of the first amount of funds drawn from the line of credit, and during a third period of time that occurs after the first period of time and responsive to the computing component of the gaming establishment credit system confirming an occurrence of a line of credit repayment event:
decrease the gaming establishment cashless wagering account based on a third amount of funds, and
decrease the outstanding line of credit balance based on the third amount of funds.

2. The gaming establishment fund management system of claim 1, wherein the first amount of funds is greater than the third amount of funds.

3. The gaming establishment fund management system of claim 1, wherein the line of credit activation event occurs at least partially via a mobile device application being executed by a mobile device.

4. The gaming establishment fund management system of claim 1, wherein the line of credit repayment event occurs independent of any event occurring at any electronic gaming machine.

5. The gaming establishment fund management system of claim 1, wherein the line of credit repayment event occurs responsive to a request received from the computing component of the gaming establishment credit system.

6. The gaming establishment fund management system of claim 1, wherein when executed by the processor during a fourth period of time that occurs after the first period of time and prior to the third period of time and responsive to the computing component of the gaming establishment credit system confirming another occurrence of another line of credit activation event, the instructions cause the processor to:
increase the gaming establishment cashless wagering account based on a fourth amount of funds drawn from another line of credit, and
increase the outstanding line of credit balance based on the fourth amount of funds.

7. The gaming establishment fund management system of claim 6, wherein when executed by the processor responsive to the computing component of the gaming establishment credit system confirming another occurrence of another line of credit repayment event, the instructions cause the processor to:
decrease the gaming establishment cashless wagering account based on a fifth amount of funds, and
decrease the other outstanding line of credit balance based on the fifth amount of funds, said decrease occurring independent of any decrease of any other lines of credit.

8. An electronic gaming machine comprising:
a housing including a door;
a security sensor supported by the housing;
a first input device supported by the housing;
a second, different input device supported by the housing;
a payment acceptor;
a processor; and
a memory device that stores a plurality of instructions that, when executed by the processor, cause the processor to:
during a first period of time:
responsive to a transfer, from a gaming establishment cashless wagering account maintained by a computing component of a gaming establishment fund management system, of a first amount of funds from an activation of a line of credit issued from a gaming establishment credit system, increase an amount of a credit balance based on the first amount of funds, and
responsive to a physical item being received via the payment acceptor, modify the credit balance based on a monetary value indicated by the received physical item,
during a second period of time subsequent to the first period of time:
responsive to a detection, via the security sensor, of an opening of the door:
cause data associated with the opening of the door to be stored, and
disable any inputs, via the first input device, to place any wagers, and
responsive to a placement, via the first input device when the door is closed, of an amount of a wager, decrease the amount of the credit balance based on the amount of the wager, and
during a third period of time subsequent to the first period of time and responsive to a cashout input received via the second, different input device, cause a transfer of the amount of the credit balance to the gaming establishment cashless wagering account, wherein the transfer minimizes data transmissions based on the line of credit by occurring independent of any communication, via any communication interface and to any computing component of the gaming establishment credit system, of any data that results in a transfer of any amount of the credit balance to the gaming establishment credit system.

9. A method of operating a gaming establishment fund management system, the method comprising:

during a first period of time and after an establishment of a line of credit with a gaming establishment credit system and responsive to a computing component of the gaming establishment credit system confirming an occurrence of a line of credit activation event:

increasing, by a processor, a gaming establishment cashless wagering account based on a first amount of funds drawn from the line of credit, and increasing, by the processor, an outstanding line of credit balance based on the first amount of funds, wherein the outstanding line of credit balance is maintained separate from the gaming establishment cashless wagering account and maintained separate from the computing component of the gaming establishment credit system, during a second period of time that occurs after the first period of time, prior to a repayment of the first amount of funds drawn from the line of credit, and following a transfer of at least a portion of the first amount of funds to a credit balance of an electronic gaming machine, and responsive to a request, made when a door of a housing of the electronic gaming machine is closed, to transfer a second amount of funds from the credit balance of the electronic gaming device to the gaming establishment cashless wagering account, increasing, by the processor, the gaming establishment cashless wagering account based on the second amount of funds, wherein the transfer of at least the portion of the first amount of funds to the credit balance of the electronic gaming machine comprises a serial communication, via a communication interface, of data to a slot machine interface board operable with a master gaming controller of the electronic gaming machine, a receipt, via the communication interface, of data associated with a detection, by a security sensor supported by the housing of the electronic gaming machine, that the door of the housing of the electronic gaming machine is open prevents the transfer of the second amount of funds from the credit balance of the electronic gaming device to the gaming establishment cashless wagering account, and the increase of the gaming establishment cashless wagering account during the second period of time occurs independent of the computing component of the gaming establishment credit system to minimize data transmissions based on the line of credit by occurring via not communicating any data to the computing component of the gaming establishment credit system that results in any modification of the outstanding line of credit balance and via not communicating any data to the computing component of the gaming establishment credit system that result in causing any transfer of any portion of the second amount of funds to repay any portion of the first amount of funds drawn from the line of credit, and during a third period of time that occurs after the first period of time and responsive to the computing component of the gaming establishment credit system confirming an occurrence of a line of credit repayment event:

decreasing, by the processor, the gaming establishment cashless wagering account based on a third amount of funds, and decreasing, by the processor, the outstanding line of credit balance based on the third amount of funds.

10. The method of claim 9, wherein the first amount of funds is greater than the third amount of funds.

11. The method of claim 9, wherein the line of credit activation event occurs at least partially via a mobile device application being executed by a mobile device.

12. The method of claim 9, wherein the line of credit repayment event occurs independent of any event occurring at any electronic gaming machine.

13. The method of claim 9, wherein the line of credit repayment event occurs responsive to a request received from the computing component of the gaming establishment credit system.

14. The method of claim 9, further comprising, during a fourth period of time that occurs after the first period of time and prior to the third period of time and responsive to the computing component of the gaming establishment credit system confirming another occurrence of another line of credit activation event:

increasing, by the processor, the gaming establishment cashless wagering account based on a fourth amount of funds drawn from another line of credit, and increasing, by the processor, the outstanding line of credit balance based on the fourth amount of funds.

15. The method of claim 14, further comprising, responsive to the computing component of the gaming establishment credit system confirming another occurrence of another line of credit repayment event:

decreasing, by the processor, the gaming establishment cashless wagering account based on a fifth amount of funds, and decreasing, by the processor, the other outstanding line of credit balance based on the fifth amount of funds, said decrease occurring independent of any decrease of any other lines of credit.

* * * * *